(12) United States Patent
Kim et al.

(10) Patent No.: US 8,587,746 B2
(45) Date of Patent: Nov. 19, 2013

(54) LIQUID CRYSTAL DISPLAY AND METHOD OF ASSEMBLING THE SAME

(75) Inventors: Tae-Seok Kim, Suwon-si (KR); Sang-Soo Kim, Seoul (KR); Tae-Seok Jang, Suwon-si (KR); Jin-Sung Choi, Yongin-si (KR); Seung-Hwan Chung, Anyang-si (KR)

(73) Assignee: Samsung Display Co., Ltd. (KR)

( * ) Notice: Subject to any disclaimer, the term of this patent is extended or adjusted under 35 U.S.C. 154(b) by 734 days.

(21) Appl. No.: 12/574,246

(22) Filed: Oct. 6, 2009

(65) Prior Publication Data

US 2010/0128198 A1 May 27, 2010

(30) Foreign Application Priority Data

Nov. 24, 2008 (KR) .................. 10-2008-0117020

(51) Int. Cl.
*G02F 1/1335* (2006.01)

(52) U.S. Cl.
USPC .............................................. 349/61; 349/65

(58) Field of Classification Search
None
See application file for complete search history.

(56) References Cited

U.S. PATENT DOCUMENTS

| | | | | |
|---|---|---|---|---|
| 4,708,439 A | * | 11/1987 | Ishii et al. | 349/64 |
| 5,724,112 A | * | 3/1998 | Yoshida et al. | 349/117 |
| 6,106,128 A | * | 8/2000 | Zou et al. | 362/606 |
| 6,490,016 B1 | * | 12/2002 | Koura | 349/58 |
| 6,502,945 B2 | * | 1/2003 | Kim et al. | 362/27 |
| 2005/0140901 A1 | * | 6/2005 | Yang et al. | 349/141 |
| 2008/0186576 A1 | * | 8/2008 | Takada | 359/492 |

FOREIGN PATENT DOCUMENTS

| | | |
|---|---|---|
| JP | 2000355391 A | 12/2000 |
| KR | 1020060093956 A | 8/2006 |
| KR | 1020070072177 A | 7/2007 |
| KR | 1020080000407 A | 1/2008 |

\* cited by examiner

*Primary Examiner* — Lucy Chien

(74) *Attorney, Agent, or Firm* — Cantor Colburn LLP

(57) ABSTRACT

A liquid crystal display including a backlight assembly, panel guides and a liquid crystal panel. The backlight assembly includes a light guide plate, optical sheets disposed on the light guide plate, a reflective sheet disposed under the light guide plate, light sources disposed along at least one of first sides of the light guide plate, light source covers which cover the light sources, respectively, guide members disposed along at least one of second sides of the light guide plate, and a packing sheet in which the light guide plate, the optical sheets, the reflective sheet, the light source covers, and the guide members are wrapped. The panel guides are disposed on the packing sheet and coupled to the guide members, respectively. The liquid crystal panel is placed on the panel guides. An extension direction of the first sides crosses an extension direction of the second sides.

19 Claims, 21 Drawing Sheets

LIQUID CRYSTAL DISPLAY AND METHOD OF ASSEMBLING THE SAME

This application claims priority to Korean Patent Application No. 10-2008-0117020 filed on Nov. 24, 2008, and all the benefits accruing therefrom under 35 U.S.C. §119, the disclosure of which is incorporated herein by reference in its entirety.

BACKGROUND OF THE INVENTION

1. Field of the Invention

The present invention relates to a liquid crystal display ("LCD") and a method of assembling the same, and more particularly, to an LCD including parts, which are manufactured in a simplified process and a reduced time and are integrated with each other, and a method of assembling the LCD.

2. Description of the Related Art

Liquid crystal displays ("LCDs") are one of the most widely used flat panel displays ("FPDs"). An LCD includes two substrates, on which electrodes are formed, and a liquid crystal layer which is interposed between the two substrates. The LCD rearranges liquid crystal molecules of the liquid crystal layer by applying voltages to the electrodes and thus controls the amount of light that passes through the liquid crystal layer. In this way, the LCD displays desired images.

Being non-self-luminous, LCDs require a backlight assembly to provide light to a liquid crystal panel. A backlight assembly includes light sources, a light guide plate ("LGP"), a plurality of optical sheets, a reflective sheet, and the like.

BRIEF SUMMARY OF THE INVENTION

Since a backlight assembly includes optical sheets, there may be technical challenges or difficulties in employing the optical sheets in the backlight assembly. For example, the optical sheets may easily move within the backlight assembly. When the optical sheets move, they may get wrinkled, grind against each other, or cause a pooling phenomenon.

In order to reduce or effectively prevent the above described problems, holes may be formed in each optical sheet, or the optical sheets may be fixed to each other by using a fixing member, such as a double-sided tape. However, the total manufacturing time of an LCD may be undesirably increased due to the time required to manufacture and assemble the separate optical sheets and the fixing member. In addition, foreign matter may undesirably be generated or allowed to be disposed within the backlight assembly Exemplary embodiments of the present invention provide a liquid crystal display ("LCD") including parts, which are manufactured in a simplified process and a reduced time, and are integrated with each other.

Exemplary embodiments of the present invention also provide a method of assembling an LCD including parts, which are manufactured in a simplified process and a reduced time, and are integrated with each other.

In an exemplary embodiment of the present invention, there is provided an LCD including a backlight assembly, panel guides and a liquid crystal panel. The backlight assembly includes a light guide plate ("LGP"), one or more optical sheets which are disposed on the LGP, a reflective sheet which is disposed under the LGP, light sources which are disposed along at least one of first sides of the LGP, light source covers which cover the light sources, respectively, guide members which are disposed along at least one of second sides of the LGP, and a packing sheet in which the LGP, the optical sheets, the reflective sheet, the light source covers, and the guide members are wrapped. The panel guides are disposed on the packing sheet and coupled to the guide members, respectively. The liquid crystal panel is placed on the panel guides. An extension direction of the first sides crosses an extension direction of the second sides.

In an exemplary embodiment, there is provided a method of assembling an LCD. The method includes disposing one or more optical sheets on an LGP and disposing a reflective sheet under the LGP, disposing light sources along at least one of first sides of the LGP and disposing light source covers, which cover the light sources, respectively, at the same height as the optical sheets, providing guide members which are disposed along at least one of second sides of the LGP, wrapping the LGP, the optical sheets, the reflective sheet, the light source covers, and the guide members in a packing sheet, coupling panel guides to the guide members, respectively, and disposing a liquid crystal panel on the panel guides. A longitudinal direction of the first sides crosses a longitudinal direction of the second sides.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
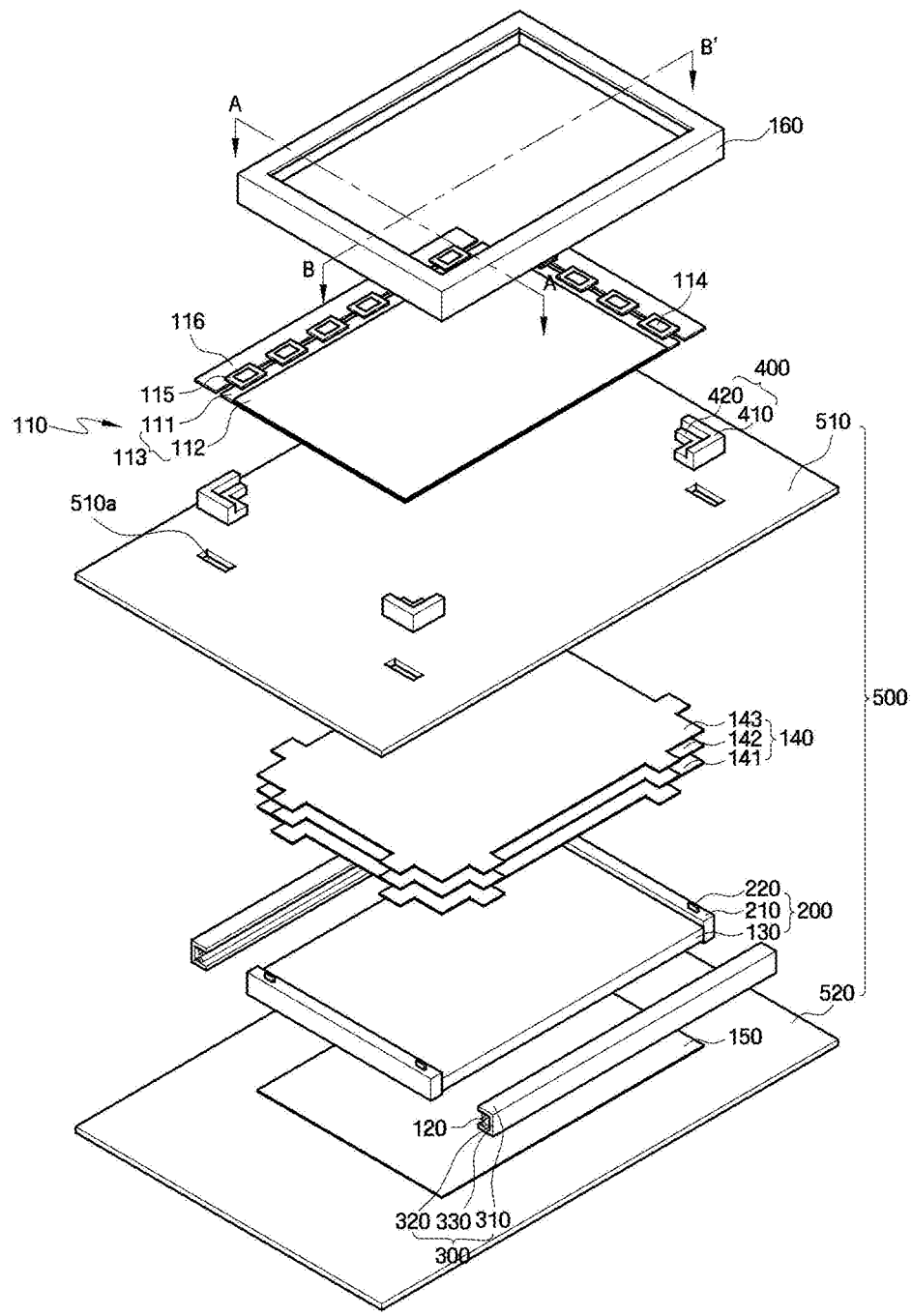
FIG. 1 is an exploded perspective view of a liquid crystal display ("LCD") according to a first exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In some embodiments, well-known processing processes, well-known structures and well-known technologies will not be specifically described in order to avoid ambiguous interpretation of the present invention. Like reference numerals refer to like elements throughout the specification.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "under," "upper," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" or "lower" relative to other elements or components would then be oriented "above" the other elements or components. Thus, the exemplary term "under" or "lower" can encompass both an orientation of above and below. The device may be otherwise oriented and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Liquid crystal displays ("LCDs") described in the present invention include notebook computers, monitors, portable multimedia players ("PMPs"), personal digital assistants ("PDAs"), digital versatile disk ("DVD") players, and cellular phones. For ease of description, a monitor will hereinafter be described as an LCD according to the present invention. However, the present invention is not limited thereto and includes the above LCDs.

Hereinafter, exemplary embodiments of the present invention will be described in detail with reference to the attached drawings.

Figure 2:
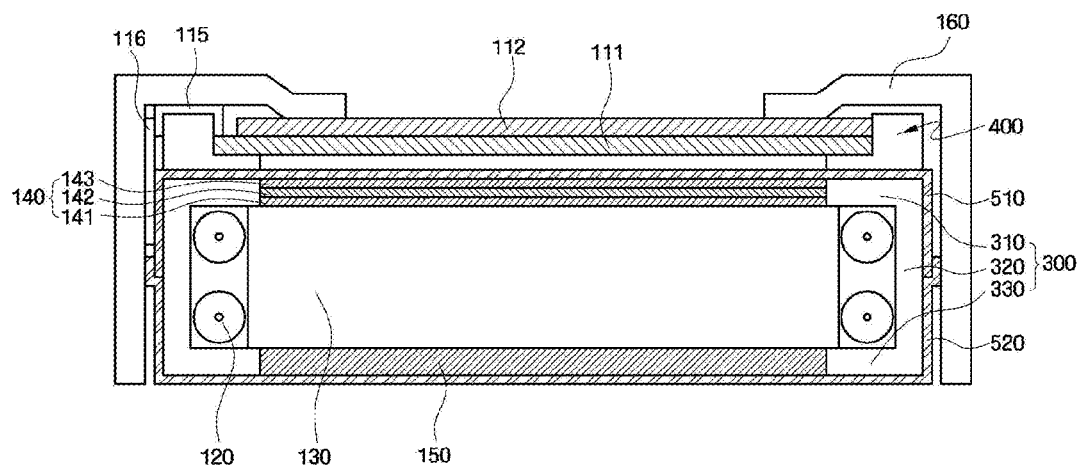
FIG. 2 is a cross-sectional view of the LCD, taken along line A-A' of FIG. 1.
Figure 3:
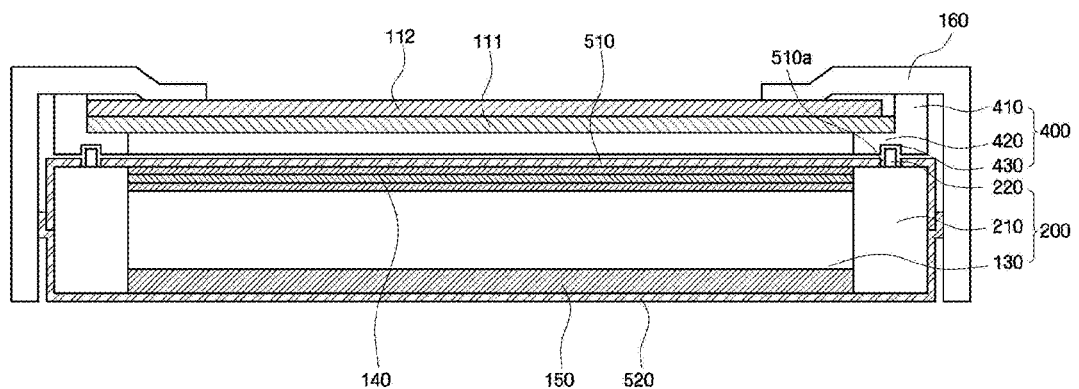
FIG. 3 is a cross-sectional view of the LCD, taken along line B-B' of FIG. 1.

FIG. 1 is an exploded perspective view of an LCD according to a first exemplary embodiment of the present invention. FIG. 2 is a cross-sectional view of the LCD, taken along line A-A' of FIG. 1. FIG. 3 is a cross-sectional view of the, taken along line B-B' of FIG. 1.

Referring to FIGS. 1 through 3, the LCD according to the illustrated embodiment includes an integrated backlight assembly, which includes a liquid crystal panel assembly 110, a light source 120, one or more of an optical sheet 140, a reflective sheet 150, an upper housing 160, a light guide plate ("LGP") assembly 200, a plurality of a light source cover 300, a plurality of a panel guide 400, and a packing sheet (member)

500. The LGP assembly 200 includes an LGP 130, a plurality of a sheet support 210 and a plurality of a panel guide-fixing protrusion 220.

The liquid crystal panel assembly 110 includes a liquid crystal panel 113 which includes a thin-film transistor ("TFT") substrate 111 and a color filter substrate 112, liquid crystals (not shown), a gate tape carrier package 114, a data tape carrier package 115, and a printed circuit board ("PCB") 116.

The liquid crystal panel 113 includes the TFT substrate 111 and the color filter substrate 112 facing the TFT substrate 111. The TFT substrate 111 includes gate lines (not shown), data lines (not shown), a TFT array (not shown), pixel electrodes (not shown), and the like, and the color filter substrate 112 includes a black matrix (not shown), a common electrode (not shown), and the like.

The liquid crystal panel 113 including the above substrates disposed facing each other is disposed on the panel guides 400, which will be described later.

The gate tape carrier package 114 is electrically and/or physically connected to each gate line (not shown) disposed on the TFT substrate 111, and the data tape carrier package 115 is electrically and/or physically connected to each data line (not shown) disposed on the TFT substrate 111.

In an exemplary embodiment, various driving parts are mounted on the PCB 116 to process a gate-driving signal and a data-driving signal, such that the processed gate-driving signal can be input to the gate tape carrier package 114 and that the processed data-driving signal can be input to the data tape carrier package 115. In an assembled state of the LCD, the data tape carrier package 115 is bent along an upper portion of each of a corresponding one of the panel guides 400, which are disposed directly adjacent to an edge of an upper packing sheet 510 of the packing sheet 500, and the PCB 116 is interposed between a sidewall of the upper housing 160 and the upper packing sheet 510. The upper packing sheet 510 is a substantially planar member.

In exemplary embodiments, the plurality of the light source 120 may be a plurality of a light-emitting diode ("LEDs"), a plurality of a cold cathode fluorescent lamp ("CCFLs"), a plurality of an external electrode fluorescent lamp ("EEFLs"), or the like. In the illustrated embodiment, the light sources 120 may be CCFLs. Each of the light sources 120 according to the illustrated embodiment extends in a horizontal direction of the LCD, extending longitudinally in a first direction.

The light sources 120 according to the illustrated invention may be disposed in an edge type backlight assembly. As shown in FIG. 1, the light sources 120 are disposed directly adjacent to one or more sides of the LGP 130. The light sources 120 may be disposed directly on a single (one) side of the LGP 130, or may be disposed directly on both of opposing sides of the LGP 130.

The light sources 120 may be covered by the light source covers 300, respectively. The light source covers 300 may be disposed on all sides of the light sources 120 except for the side of the LGP 130 the light sources 120 disposed adjacent to. Light generated and emitted from the light sources 120 is transmitted to the optical sheets 140 to pass through the optical sheets 140, via the LGP 130. The light emitted from the light sources 120 first must pass through the LGP 130 before entering the optical sheets 140.

At least one side of the LGP 130 faces the light sources 120. The LGP 130 guides light generated and emitted from the light sources 120. The LGP 130 according to the illustrated embodiment concentrates light and/or adjusts the amount of light. In order to efficiently guide light, an exemplary embodiment of the LGP 130 may include a light-transmitting material, such as acrylic resin (e.g., polymethyl methacrylate ("PMMA")), or a material having a constant refractive index, such as polycarbonate ("PC").

The LGP 130 may be substantially rectilinear, or wedge-shaped. The LGP 130 includes a light incident (side) surface, an upper surface, a lower surface facing the upper surface, and a plurality of side surfaces connecting the upper surface and the lower surface to each other. The upper surface of the LGP 130 may also be referred to as a light exiting or emitting surface. Hereinafter, "upper" may refer to a viewing side, or front of the LCD, while "lower" may refer to a side opposing the viewing side, or rear of the LCD.

Light from the light sources 120 incident upon the side surface of the LGP 130, which is made of the above materials, has an angle less than a critical angle of the LGP 130. Thus, the light is input to the LGP 130, via a light incident surface of the LGP 130 adjacent to a light source 120. In contrast, when the light is incident upon an upper or lower surface of the LGP 130, an angle of incidence of the light is greater than the critical angle of the LGP 130. Thus, the light does not exit from the LGP 130. Instead, the light is evenly delivered within the LGP 130. In an exemplary embodiment, a diffusion pattern (not shown) may be disposed on at least one of the upper and lower surfaces of the LGP 130. The diffusion pattern directs light, which reaches the upper or lower surface of the LGP 130, toward the liquid crystal panel 113.

The optical sheets 140 diffuse and concentrate light which is received from the LGP 130. The optical sheets 140 may be disposed on the LGP 130 in a viewing side of the LCD. In the illustrated exemplary embodiment, the optical sheets 140 include a diffusion sheet 141, a prism sheet 142, and a protective sheet 143.

The diffusion sheet 141 is disposed directly adjacent to and on the LGP 130 and enhances the luminance uniformity of light which is received from the light sources 120. The diffusion sheet 141 diffuses light, which is received from the light sources 120, in order to reduce or effectively prevent the light from being concentrated in a specific area.

The prism sheet 142 is disposed directly adjacent to and on the diffusion sheet 141, and concentrates and outputs light which is diffused by the diffusion sheet 141. The prism sheet 142 may include first and second prism sheets, each including respective prism patterns which cross each other. In an exemplary embodiment, when sufficient luminance and viewing angles can be secured by using only the first prism sheet, the second prism sheet may be omitted.

The protective sheet 143 may be disposed directly adjacent to and on the prism sheet 142 and protect an upper surface of the prism sheet 142. In addition, the protective sheet 143 may diffuse light for uniform distribution of the light.

The reflective sheet 150 is disposed directly on lower packing sheet 520, and between the lower packing sheet 520 and the LGP assembly 200. The upper packing sheet 510 is a substantially planar member. From the light emitted from the light sources 120, light which fails to travel upward and leaks downward (e.g., toward a rear of the LCD), is reflected upward by the reflective sheet 150 toward the front of the LCD.

In an exemplary embodiment, the reflective sheet 150 may be manufactured by spreading white pigments, such as titanium oxide (TiO2), on a synthetic resin sheet. Bubbles may also be spread on the synthetic resin sheet to diffuse light.

The reflective sheet 150 may be substantially rectangular, and both sides of the reflective sheet 150, which are orthogonal to the direction in which the light sources 120 extend, may include inclined surfaces, respectively, to enhance luminance of light.

The upper housing 160 is disposed on the liquid crystal panel 113 and overlaps an edge portion of an upper surface of the liquid crystal panel 113. The upper housing 160 may form the uppermost element of the LCD. A window, which exposes the liquid crystal panel 113, is formed in the upper surface of the upper housing 160. Portions of the upper surface of the upper housing 160 may be bent downward (e.g., towards a rear of the LCD) at an angle to press upper edges of the liquid crystal panel 113 against the panel guides 400 and fix the liquid crystal panel 113 to the panel guides 400. The bent portions of the upper surface of the upper housing 160 may hereinafter be referred to as upper housing sidewalls. The upper edges of the liquid crystal panel 113 are disposed contacting the panel guides 400 when the upper housing 160 is assembled in the LCD.

The upper housing 160 may be coupled to sidewalls of the sheet support 210, such as by hooks (not shown) and/or screws (not shown). The upper housing sidewalls overlap and surround the sheet support 210. In addition, the upper housing 160 may be adhered to an outer surface of the packing sheet 500, such as by using an adhesive, e.g., a double-sided tape. Exposing holes (not shown) may be formed in one or more sides of the packing sheet 500 to couple the sheet support 210 to the upper housing 160.

The sheet support 210 and the panel guide-fixing protrusion 220 may hereinafter be referred to as a mold frame or as a guide member. The sheet support 210 and the panel guide-fixing protrusion 220 may be disposed as a single, continuous and indivisible member. The sheet support 210 and the panel guide-fixing protrusion 220 may be integrated with the LGP 130, such that the sheet support 210 and the panel guide-fixing protrusion 220 forms a single, continuous and indivisible member with the LGP 130, or such that the sheet support 210 and the panel guide-fixing protrusion 220 are separable from the LGP 130.

Hereinafter, the sheet support 210, the panel guide-fixing protrusion 220, and the LGP 130, which are integrated with each other, will collectively be referred to as the LGP assembly 200. The sheet support 210, the panel guide-fixing protrusion 220, and the LGP 130 may be made of the same material, and may each be formed by, e.g., injection molding. Where the sheet support 210, the panel guide-fixing protrusion 220 and the LGP 130 include the same material, a reflective material may be disposed on an outer surface of each of the sheet support 210 and/or the panel guide-fixing protrusion 220.

Alternatively, the sheet support 210, the panel guide-fixing protrusion 220, and the LGP 130 may be made of different materials. Where the sheet support 210, the panel guide-fixing protrusion 220, and the LGP 130 include different materials, each of the sheet support 210 and the panel guide-fixing protrusion 220 may be made of a mixture of light non-transmitting resin, such as polycarbonate ("PC"), and acrylonitrile butadiene styrene copolymer ("ABS").

The sheet supports 210 including the panel guide-fixing protrusion 220, may be disposed facing each other, and may be arranged substantially perpendicular to a lengthwise direction of the light sources 120. In the illustrated exemplary embodiment, when the light sources 120 longitudinally extend in a longitudinal direction of the LGP 130, the sheet support 210 and the panel guide-fixing protrusion 220 may each be longitudinally extended along a transverse (e.g., short edge) directly of the LGP 130 to be parallel to a short-side direction of the LGP 130.

Panel guide-fixing portions, such as the panel guide-fixing protrusions 220, may be disposed on an upper surface of each of the sheet support 210 and fix the panel guides 400, which will be described later, to the sheet support 210.

When the sheet support 210 and the panel guide-fixing protrusion 220 are disposed extended in the short-side direction of the LGP 130, the light sources 120 and the light source covers 300 are disposed in the long-side direction of the LGP 130.

The light source covers 300 cover the light sources 120, respectively, and fix the light sources 120 to the LGP 130. A reflective material may be coated on an inner side surface of each of the light source covers 300 to minimize the loss of light which is emitted from the light sources 120.

Each of the light source covers 300 may be bent in the form of, e.g., English character "U." Each of the light source covers 300 includes a sidewall 320 which corresponds to a sidewall of the LGP 130 and extends in the longitudinal direction of the LGP 130, an upper surface 310 which extends from an upper end of the sidewall 320 in a direction substantially parallel with the LGP 130 and toward the LGP 130, and a lower surface 330 which extends from a lower end of the sidewall 320 toward the LGP 130 and is substantially parallel with the upper surface 310. The light source covers 300 may longitudinally extend in the longitudinal direction of the LGP 130. The upper surface 310 of each of the light source covers 300 may be disposed on the same plane (e.g., coplanar), or at a same height from a reference point, as an upper surface of the optical sheets 140. In an exemplary embodiment of the present invention, the light source covers 300 may fix a protruding portion of the optical sheets 140 to the upper surface of the LGP 130. The lower surface 330 of each of the light source covers 300 may be on the same plane (e.g., coplanar), or at the same height from a reference point, as a lower surface of the reflective sheet 150. In an exemplary embodiment of the present invention, the light source covers 300 may fix a protruding portion of the reflective sheet 150 to the lower surface of the LGP 130.

A height of the upper surface 310 of each of the light source covers 300 is equal to that of the upper surface of each of sheet supports 210. The upper surface 310 of each of the light source covers 300 is on the same plane (e.g., coplanar) as an upper surface of each of the sheet supports 210. Referring to FIGS. 2 and 3, when a lower surface of the packing sheet 500 which will be described later, overlaps and contacts an upper surface of the light source covers 300 and the upper surface of the sheet support 210 and the panel guide-fixing protrusion 220, the packing sheet 500 can remain substantially flat (e.g., parallel with the LGP 130) on the upper surfaces of the light source covers 300 and the sheet support 210. Consequently, the above parts can be wrapped in the packing sheet 500 more securely.

Referring again to FIGS. 2 and 3, the LGP 130, the optical sheets 140, the reflective sheet 150, and the light source covers 300 are wrapped in the packing sheet 500. The packing sheet 500, including the upper packing sheet 510 and the lower packing sheet 520 completely overlaps side portions and a bottom portion of the optical sheets 140, the reflective sheet 150, and the light source covers 300. The packing sheet 500 also overlaps an entire of upper surfaces of the optical sheets 140, the reflective sheet 150, and the light source covers 300, except for where the panel guide-fixing protrusion 220 extends through the upper packing sheet 510 (FIG. 3). A whole of the optical sheets 140, the reflective sheet 150, and the light source covers 300 are disposed within the packing sheet 500. Advantageously, entering of foreign matter into the LGP 130, the optical sheets 140, the reflective sheet 150, and the light source covers 300 is reduced or effectively prevented.

Where the packing sheet 500 is disposed completely around the collection of the optical sheets 140, the reflective sheet 150, and the light source covers 300, the packing sheet 500 compresses the optical sheets 140, the reflective sheet 150, and the light source covers 300 together and restricts movement of these elements within the LCD. Since the optical sheets 140 are integrated with the reflective sheet 150 by using the packing sheet 500, there is no need to form holes in the optical sheets 140 and the reflective sheet 150, or use a separate member such as a double-sided tape, to reduce or effectively prevent the movement of the optical sheets 140 and the reflective sheet 150 in the LCD. Advantageously, elements of the LCD according to the illustrated invention can be manufactured more easily, while reducing a number of separate parts to be assembled.

Referring to FIGS. 1 and 3, a plurality of an air (venting) hole 510a is formed completely through a thickness of the upper packing sheet 510, and the upper packing sheet 510 solely defines the air holes 501a. As illustrated in FIG. 1, the air holes 510a are disposed proximate to each of four corners of the upper packing sheet 510, respectively, but the invention is not limited thereto. Air can flow into the packing sheet 500 through the air holes 510a, and reduce or effectively prevent the optical sheets 140 from being attached to each other under high-temperature or high-humidity conditions. In addition, the air flowing into the packing sheet 500 can minimize the difference between thermal expansion coefficients of the elements of the LCD which may be made of different materials. Advantageously, when the LCD according to the illustrated embodiment is driven or tested for reliability under high-temperature or high-humidity conditions, the possibility that the optical sheets 140 contract, warp, get wrinkled, or grind each other can be reduced.

The air holes 510a of the upper packing sheet 510 are disposed at locations corresponding to the locations of the panel guides 400. As illustrated in FIG. 3, the air holes 510a expose a portion of the LGP assembly 200, specifically, the panel guide-fixing protrusion 220. Since the air holes 510a expose the panel guide-fixing protrusions 220, respectively, the panel guides 400 disposed on the packing sheet 500 may be coupled to the panel guide-fixing protrusions 220, which are disposed extending completely through the packing sheet 500, by the air holes 510a, respectively. Although not shown in the drawings, a power outlet (not shown) may further be disposed in the packing sheet 500.

The packing sheet 500 according to the illustrated embodiment includes the upper packing sheet 510 and a lower packing sheet 520. The upper packing sheet 510 directly contacts the upper surface of each of the sheet support 210, and the upper surface 310 of each of the light source covers 300. The lower packing sheet 520 directly contacts a lower surface of each of the sheet supports 210 and the lower surface 330 of each of the light source covers 300. Since the upper surface of the optical sheets 140 is on the same plane as the upper surface 310 of each of the light source covers 300, the upper packing sheet 510 can directly contact the optical sheets 140. In addition, since the lower surface of the reflective sheet 150 is on the same plane as the lower surface 330 of each of the light sources 300, the lower packing sheet 520 can directly contact the reflective sheet 150.

The upper and lower packing sheets 510 and 520 according to the illustrated embodiment may be formed separately and then subsequently assembled with each other, such as being thermally pressed against each other. As a result, the upper and lower packing sheets 510 and 520 may be coupled to each other. Each of the upper packing sheet 510 and the lower packing sheet 520 is a single, continuous and indivisible member. In both FIGS. 2 and 3, a portion of edges of the upper and lower packing sheets 510 and 520 are disposed overlapping each other at sides of the lamp covers 300 and sides of the LGP assembly 200, such as to completely surround the collection of the optical sheets 140, the reflective sheet 150, and the light source covers 300. These overlapping portions of the upper and lower packing sheets 510 and 520 may be hereinafter referred to as bonding portions. Each of the upper and lower packing sheets 510 and 520 may include the bonding portions on four side surfaces of the LGP 130, respectively. In order to minimize an area in which the bonding portions of the upper packing sheet 510 overlap those of the lower packing sheet 520, corner portions of each of the upper and lower packing sheets 510 and 520 may be removed, such as by cutting.

The packing sheet 500 may be made of a heat-resistant and light-transmitting material. In one exemplary embodiment, the packing sheet 500 may be made of any one of polyethylene, polypropylene, polyvinyl chloride, and polyacrylate, or a combination of the same. Since the packing sheet 500 is made of a heat-resistant material, it may not contract or rupture when the light sources 120 and the light source covers 300 are wrapped in the packing sheet 500. Advantageously, since the light sources 120 and the light source covers 300 as well as other parts can be wrapped in the packing sheet 500 and fixed to each other, the structure of the LCD can be simplified.

When necessary, a surface of the packing sheet 500 may be processed to become anti-static. In one exemplary embodiment, the packing sheet 500 may have a surface resistance of about $10^8$ Ohms ($\Omega$) to about $10^{15}$ Ohms ($\Omega$). When the packing sheet 500 has a surface resistance of less than about $10^8 \Omega$, the packing sheet 500 may not be sufficiently insulating. When the packing sheet 500 has a surface resistance of more than about $10^8 \Omega$, the packing sheet 500 may not be sufficiently anti-static. Thus, foreign matter can be attached to the packing sheet 500.

Light emitted from the light sources 120 passes through the LGP 130, the optical sheets 140, and the packing sheet 500 and travels toward the liquid crystal panel 113. In one exemplary embodiment, a thickness of the packing sheet 500 may range from about 10 micrometers ($\mu$m) to about 150 micrometers ($\mu$m) in order to minimize a reduction in the luminance of light which is emitted from the light sources 120, and in consideration of the hardness of the packing sheet 500. If the thickness of the packing sheet 500 is less than about 10 $\mu$m, the packing sheet 500 may be damaged during the thermal pressing process. If the thickness of the packing sheet 500 is greater than about 150 $\mu$m, a bending process of the packing sheet 500 may be deteriorated.

As discussed above, and referring again to FIGS. 1 and 3, the panel guides 400 may be disposed at the four corners of the upper packing sheet 510, respectively, and fixed to the panel guide-fixing protrusions 220 by the air holes 510a, respectively. Fixing grooves 430 may be disposed in a lower surface of the panel guides 400 and coupled to the panel guide-fixing protrusions 220, respectively. The panel guide-fixing protrusion 220 extending from the sheet support 210 through the upper packing sheet 510 protrudes from the lower surface of the panel guide 400 into an inner area of the panel guide 400. A portion of the upper packing sheet 510 is disposed between the panel guide 400 and the upper surface of the sheet support 210. Thus, the panel guides 400 can be tightly fitted over the panel guide-fixing protrusions 220, respectively.

Various methods may be used to couple the panel guides 400 to the panel guide-fixing protrusions 220, respectively. In one exemplary embodiment, the panel guide-fixing protrusions 220 may be coupled respectively to the panel guides 400 by hooks or clips. Alternatively, the panel guide-fixing protrusions 220 may be slidably disposed into and thus be coupled to the panel guides 400, respectively. In the illustrated embodiment, the panel guide-fixing protrusions 220 are disposed on each of the sheet supports 210. However, the present invention is not limited thereto. In an alternative exemplary embodiment, the panel guide-fixing protrusions 220 may also be disposed on each of the light source covers 300.

Referring again to FIGS. 1-3, each of the panel guides 400 may include a panel guide sidewall 410, a panel guide platform 420 and the fixing groove 430. The liquid crystal panel 113 is disposed on and contacting an upper surface of the panel guide platform 420. Edge sides of the TFT substrate 111 and the color filter substrate 12 are disposed facing and directly contacting inner surfaces of the panel guide sidewall 410. In an plan view of the LCD, the panel guides 400 may be shaped like English character "L" and may be disposed at the four corners of the LCD, respectively. The panel guide platform 420 and the panel guide sidewall 410 may define a stepped portion of the panel guide 400, upon which the LC panel 113 is disposed.

A portion of the panel guides 400 is disposed overlapping and between a portion of both the LC panel 113 and the packing sheet 500. At remaining portions of both the LC panel 113 and the packing sheet 500, the LC panel 113 and the packing sheet 500 are separated from each other, with no other element or feature of the LCD disposed therebetween. Advantageously, the panel guides 400 reduce or effectively prevent rubbing or grinding of the liquid crystal panel 113 and the upper packing sheet 510 against each other. The data tape carrier package 115 may be bent along an upper part of the panel guide sidewall 410, and the PCB 116 may be interposed between the upper packing sheet 510 and a sidewall of the upper housing 160.

Hereinafter, a method of assembling an LCD according to a second exemplary embodiment of the present invention will be described in detail with reference to FIGS. 1 and 4A through 4E. For ease of description, elements having the same functions as those illustrated in the drawings for the first exemplary embodiment are indicated by like reference numerals, and thus their description will be omitted or simplified. FIGS. 4A through 4E are cross-sectional views sequentially illustrating processes included in the method of assembling an LCD according to the second exemplary embodiment of the present invention.

Figure 4A:
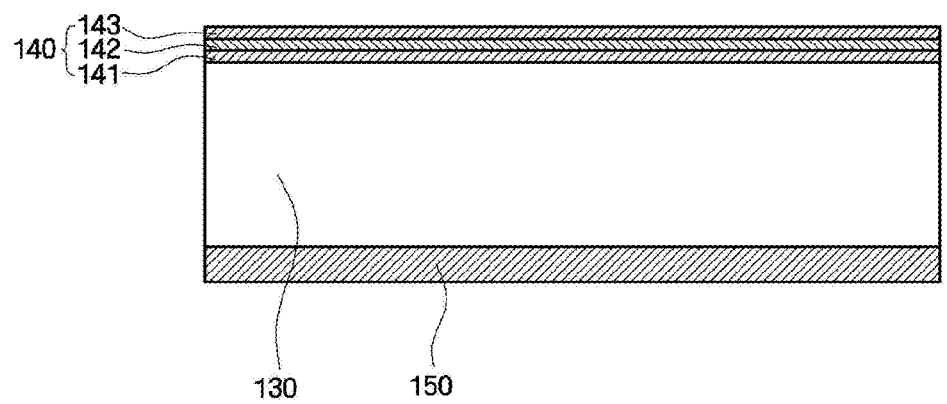
FIGS. 4A through 4E are views sequentially illustrating processes included in a method of assembling an LCD according to a second exemplary embodiment of the present invention.

Referring to FIGS. 1, 2 and 4A, the LGP 130 is provided. The LGP 130 according to the illustrated embodiment is integrated with the sheet support 210 and the panel guide-fixing protrusion 220, either by being formed as a single, continuous and indivisible unit or by forming parts separately and subsequently assembling them. The providing of the LGP 130 includes providing the sheet support 210 and the panel guide-fixing protrusion 220. The sheet supports 210 including the panel guide-fixing protrusions 220 are disposed facing each other and are integrated with the LGP 130 along both of opposing sides of the LGP 130 which are substantially perpendicular to the light source covers 300, respectively. As described above in the first exemplary embodiment, an upper surface of each of the sheet supports 210 is at the same height as the upper surface 310 of each of the light source covers 300.

The LGP assembly 200, which includes the LGP 130 integrated with the sheet supports 210 and the panel guide-fixing protrusions 220, may be made of a light-transmitting material by injection molding. Alternatively, the sheet support 210 and panel guide-fixing protrusion 220 may be made of a light non-transmitting material.

Figure 4B:
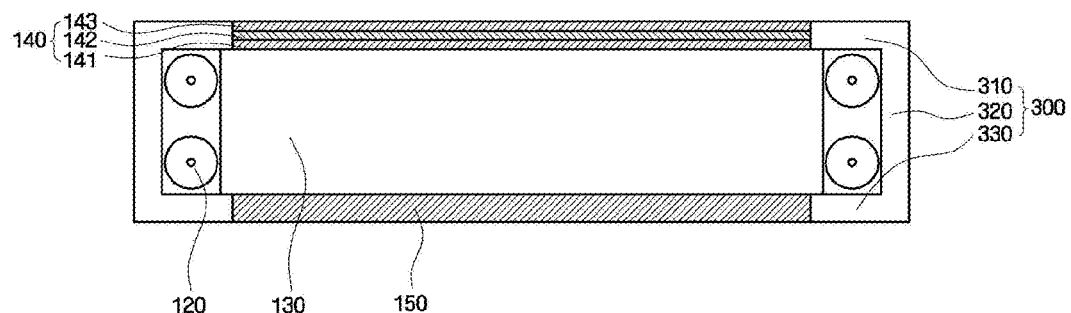

Referring to FIG. 4B, the light sources 120 and the light source covers 300 are disposed parallel to long sides of the LGP 130, respectively. In the illustrated embodiment, the optical sheets 140 and the reflective sheet 140 may be fixed to the LGP 130 respectively by the upper surface 310 and the lower surface 330 of each of the light source covers 300.

Figure 4C:
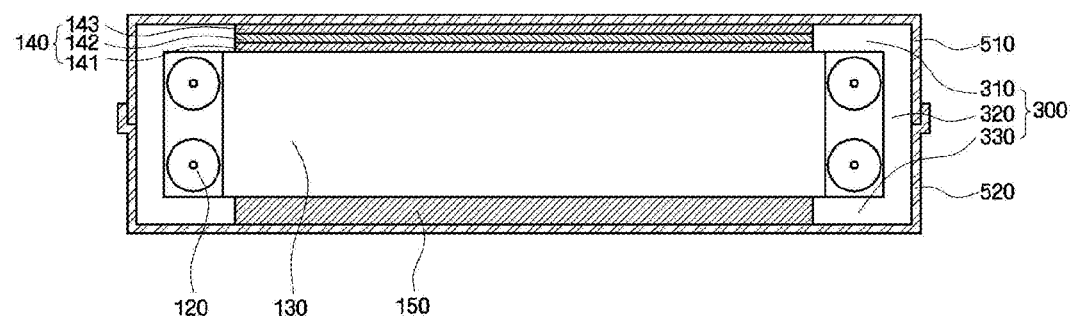

Referring to FIG. 4C, the upper packing sheet 510 is disposed adjacent to and on the optical sheets 140, and the lower packing sheet 520 is disposed adjacent to and under the reflective sheet 150. The upper and lower packing sheets 510 and 520 according to illustrated embodiment are initially provided separately. The upper packing sheet 510 may directly contact the upper surface 310 of each of the light source covers 300, and the lower packing sheet 520 may directly contact the lower surface 330 of each of the light source covers 300. Since the upper surface 310 of each of the light source covers 300 is at the same height as the upper surface of each of the sheet supports 210, the upper packing sheet 510 can directly contact the upper surface 310 of each of the light source covers 300 and the upper surface of each of the sheet supports 210, and the lower packing sheet 520 can directly contact the lower surface 330 of each of the light source covers 300 and the lower surface of each of the sheet supports 210.

Each of portions of the upper packing sheet 510 overlapping portions of the lower packing sheet 520 is thermally pressed against a corresponding overlapping portion of the lower packing sheet 520. As a result, the upper packing sheet 510 is bonded to the lower packing sheet 520 at areas where the first and second packing sheets 510 and 520 are overlapped with each other. The bonding of the first and second packing sheets 510 maintains the packing sheet 500 taut around the elements of the LCD disposed within the packing sheet 500.

Figure 4D:
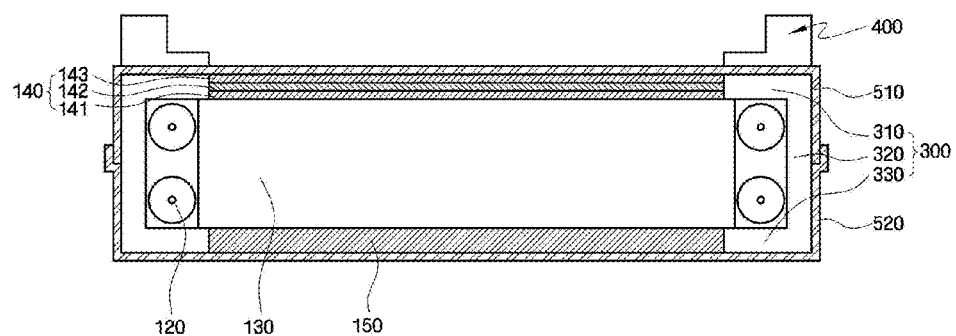

Referring to FIG. 4D, the panel guides 400 are pressed downward and thus coupled to the panel guide-fixing protrusions 220, respectively. The panel guides 400 are assembled with the guide-fixing protrusions 220 in a vertical insertion direction, from a front of the LCD towards a rear of the LCD. Since the panel guide-fixing protrusions 220 are exposed by the air holes 510a in the upper packing sheet 510, the panel guides 400 can be easily coupled onto the upper packing sheet 510.

Figure 4E:
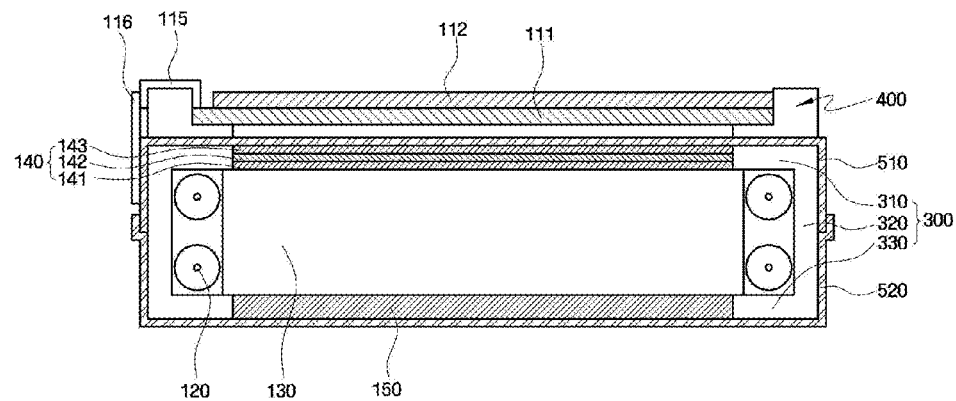

Referring to FIG. 4E, the liquid crystal panel 113 (see FIG. 1), which includes the TFT substrate 111 and the color filter substrate 112, is disposed directly on the panel guides 400. An entire of the liquid crystal panel 113 is disposed between the panel guides 400 of the LCD, in the plan view of the LCD.

Referring to again FIG. 2, the upper housing 160 is coupled to sheet supports 210 and/or the panel guide-fixing protrusion 220 or the packing sheet 500. The upper surface of the upper housing 160 may press a portion of the upper surface of the liquid crystal panel 113, and thus fix the liquid crystal panel 113 to the panel guides 400.

Figure 5:
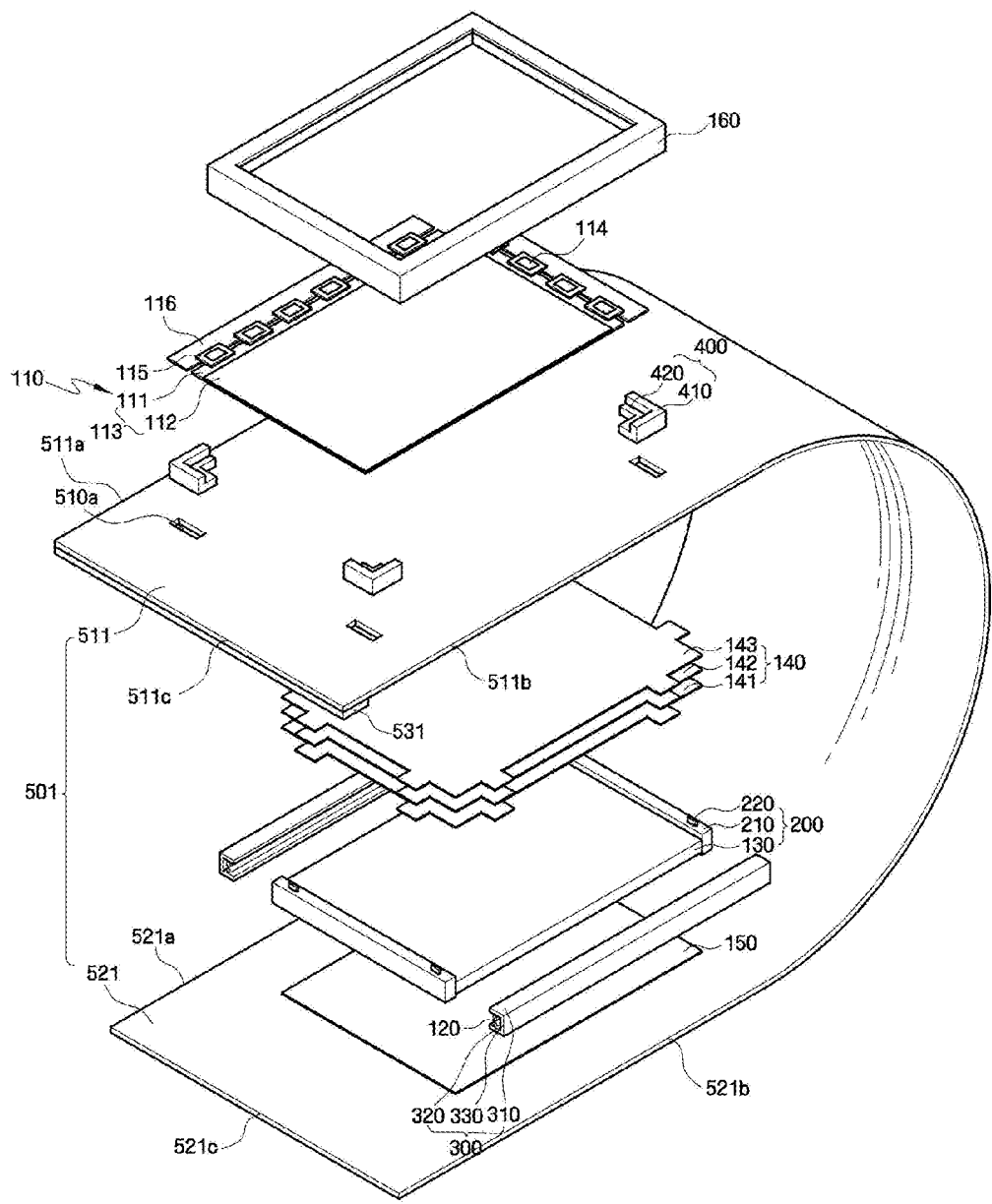
FIG. 5 is an exploded perspective view of an LCD according to a third exemplary embodiment of the present invention.

Hereinafter, an LCD according to a third exemplary embodiment of the present invention will be described in detail with reference to FIG. 5. FIG. 5 is an exploded perspective view of the LCD according to the third exemplary embodiment of the present invention.

Long sides 511a and 511b of an upper packing sheet 511 may be thermally pressed against long sides 521a and 521b of a lower packing sheet 521 which correspond to the long sides 511a and 511b of the upper packing sheet 511, respectively.

The long sides 511a and 521a, and the long sides 512b and 521b may be pressed where a portion of the long sides 511a, 511b, 521a and 521b are overlapped with each other, respectively. Alternatively, respective edge faces of the long sides 511a and 521a, and the long sides 512b and 521b may be pressed together such that the edge faces contact and meet each other and there is no overlapping portions of the long sides 511a, 511b, 511b and 521b.

The upper packing sheet 511 and the lower packing sheet 521 define a single, continuous and indivisible member of the LCD. An adhesive layer 531 is disposed on an edge of a lower surface of a short side 511c of the upper packing sheet 511. The adhesive layer 531 is adhered to a lower surface of the lower packing sheet 521, when a portion of the upper packing sheet 511 is overlapped with a portion of the lower packing sheet 521.

A packing sheet 501 according to the illustrated embodiment is essentially shaped like an envelope, and is a single and continuous member defined by the upper and lower packing sheets 511 and 521. Since the upper and lower packing sheets 511 and 521 are continuous with each other, there is no overlapping portions at an area between the upper and lower packing sheets 511 and 521.

When the packing sheet 501 is assembled in the LCD, the packing sheet 501, including the upper packing sheet 511 and the lower packing sheet 521 may completely overlap side portions and a bottom portion of the optical sheets 140, the reflective sheet 150, and the light source covers 300. The packing sheet 501 may also overlap an entire of upper surfaces of the optical sheets 140, the reflective sheet 150, and the light source covers 300, except for where the panel guide-fixing protrusion 220 extends through the upper packing sheet 510 (FIG. 3). A whole of the optical sheets 140, the reflective sheet 150, and the light source covers 300 are disposed within the packing sheet 501.

Where an amount of overlapping portions of the upper packing sheet 511 and a portion of the lower packing sheet 521, which are thermally pressed against each other, are reduced, the formation of creases or wrinkles in the packing sheet 501 is advantageously reduced. In addition, since an adhesive surface between the upper packing sheet 511 and the lower packing sheet 521 is located on the lower packing sheet 521, the luminance of the LCD is not undesirably affected or reduced.

Hereinafter, a method of assembling an LCD according to a fourth exemplary embodiment of the present invention will be described in detail with reference to FIGS. 5 and 6A through 6C. FIGS. 6A through 6D are views sequentially illustrating processes included in the method of assembling an LCD according to the fourth exemplary embodiment of the present invention.

Figure 6A:
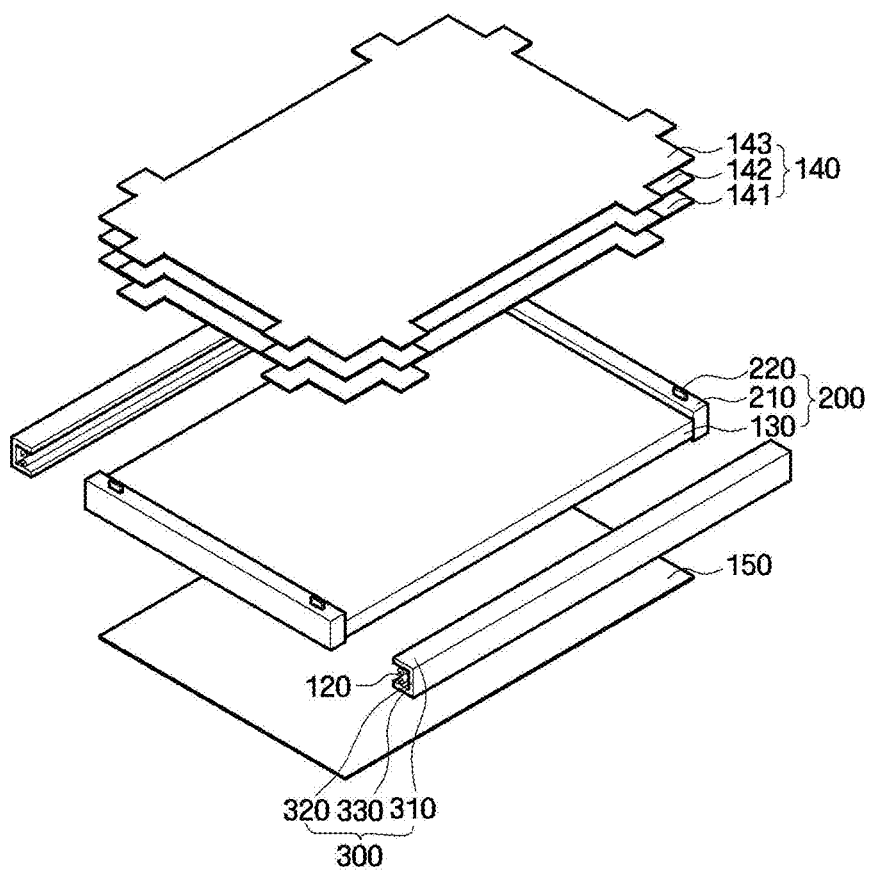
FIGS. 6A through 6D are views sequentially illustrating processes included in a method of assembling an LCD according to a fourth exemplary embodiment of the present invention.

Referring to FIG. 6A, an LGP assembly 200 is provided. The LGP assembly 200 includes an LGP 130, sheet supports 210, and panel guide-fixing protrusions 220. The sheet supports 210 each including a panel guide-fixing protrusion 220, face each other and are longitudinally extended along short sides of the LGP 130 to be integrated with the LGP 130.

In addition, one or more optical sheets 140 are disposed on the LGP 130, and a reflective sheet 150 is disposed under the LGP 130.

Light sources 120 and light source covers 300 are disposed adjacent to and on one or more light incident sides of the LGP 130. The optical sheets 140 and the reflective sheet 150 are pressed against the LGP 130 by using upper and lower surfaces 310 and 330 of each of the light source covers 300, and thus fixed to the LGP 130.

Figure 6B:
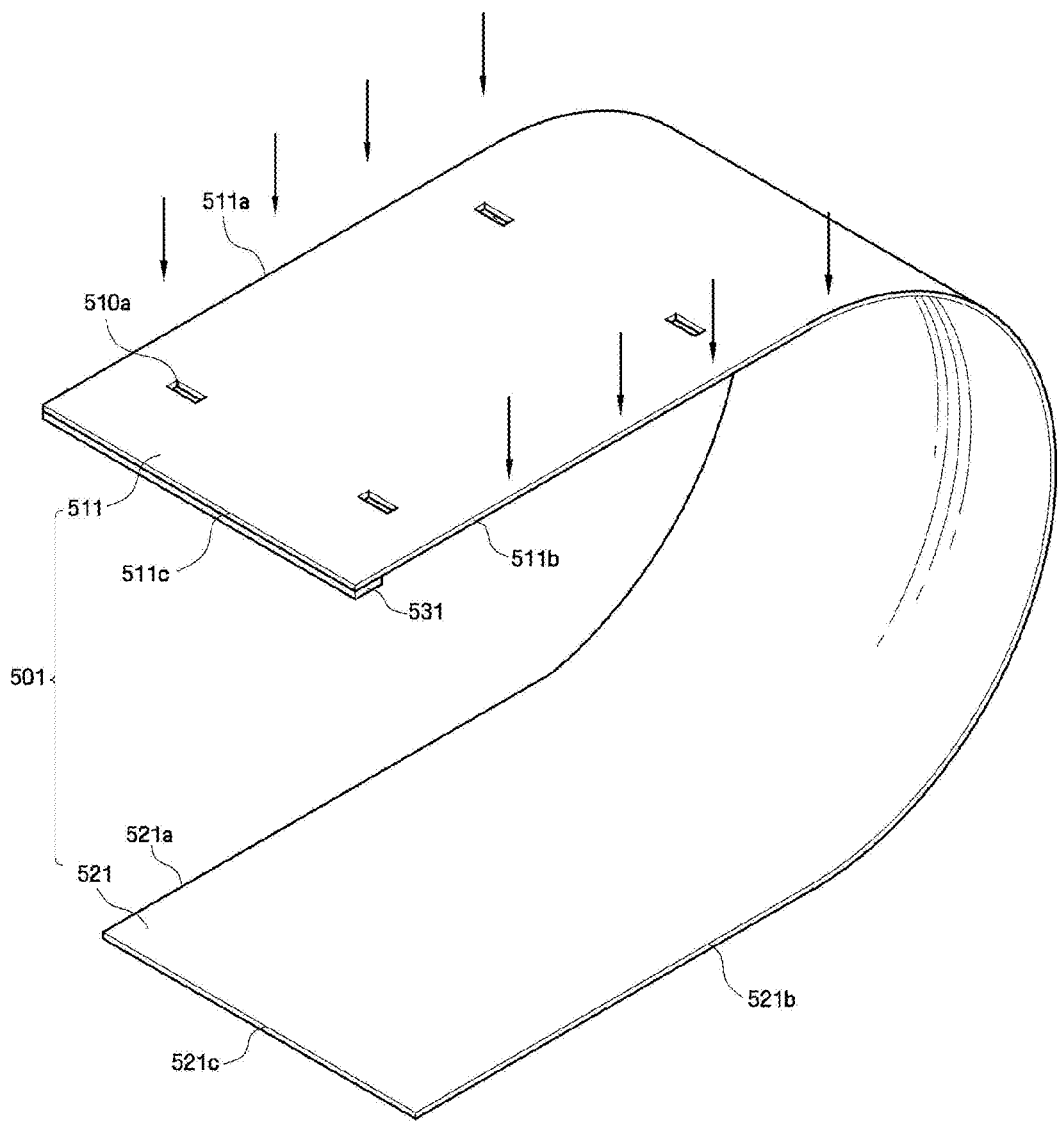

Referring to FIG. 6B, the packing sheet 501 including vent (air) holes 510a is provided. As in the third exemplary embodiment, the lower packing sheet 521 of the packing sheet 501 may longitudinally extend in a long-side direction of the upper packing sheet 511. The packing sheet 501 is provided as a single and continuous member defined by the upper and lower packing sheets 511 and 521. The long sides 511a and 521a, and the long sides 511b and 521b, collectively define single and continuous longitudinal edges of the packing sheet 501, respectively.

The long sides 511a and 511b of the upper packing sheet 511 are thermally pressed against the long sides 521a and 521b of the lower packing sheet 521 which correspond to the long sides 511a and 511b of the upper packing sheet 511, respectively. In the illustrated embodiment, thermal pressure may be applied onto the upper packing sheet 511 and the lower packing sheet 521 in a direction indicated by arrows in FIG. 6B. Since the upper and lower packing sheets 511 and 521 are continuous with each other, there is no overlapping portions at an area between the upper and lower packing sheets 511 and 521.

Figure 6C:
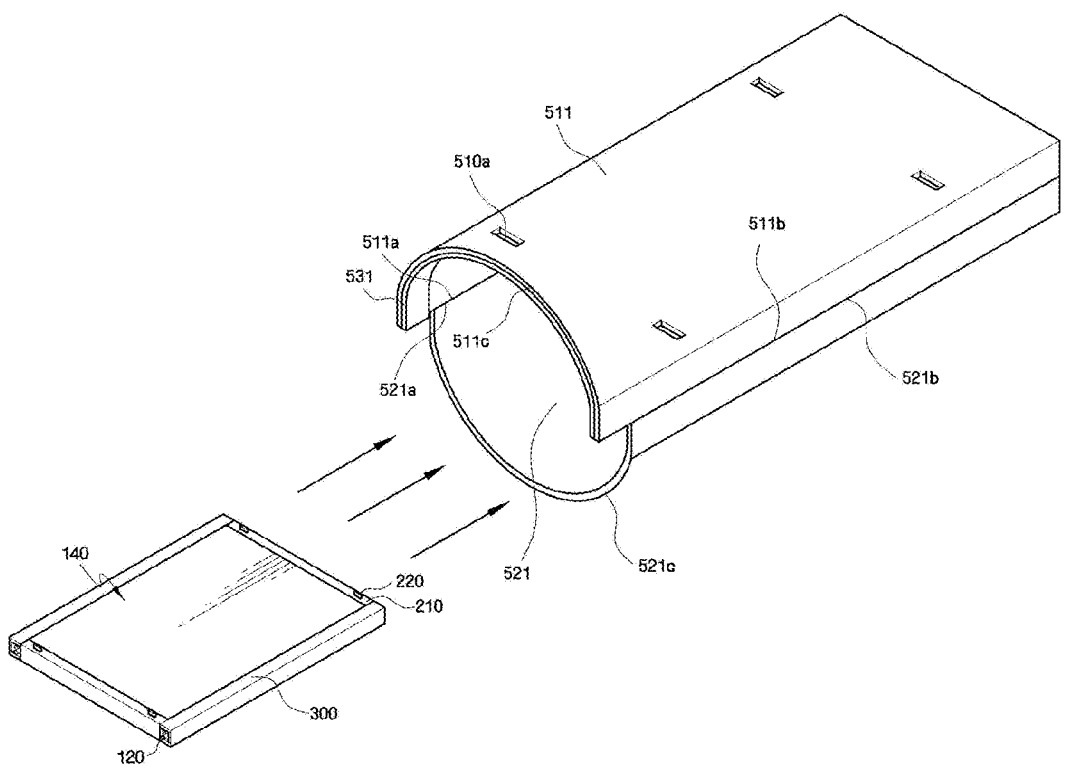

Referring to FIG. 6C, the previously assembled collection of the optical sheets 140, the LGP 130, the light source covers 300, and the reflective sheet 150 are inserted into the packing sheet 501 through an open side of the envelope-shaped packing sheet 501, in an insertion direction substantially parallel with the longitudinal direction of the LCD. At the open side of the bonded packing sheet 501, the short side 511c of the upper packing sheet 511 extends further in the longitudinal direction of the packing sheet 501, than the short side 521c of the lower packing sheet 521. A distance of extension of the short side 511c of the upper packing sheet 511 may be substantially the same as a width of the adhesive layer 531 taken in the longitudinal direction of the packing sheet 501.

Figure 6D:
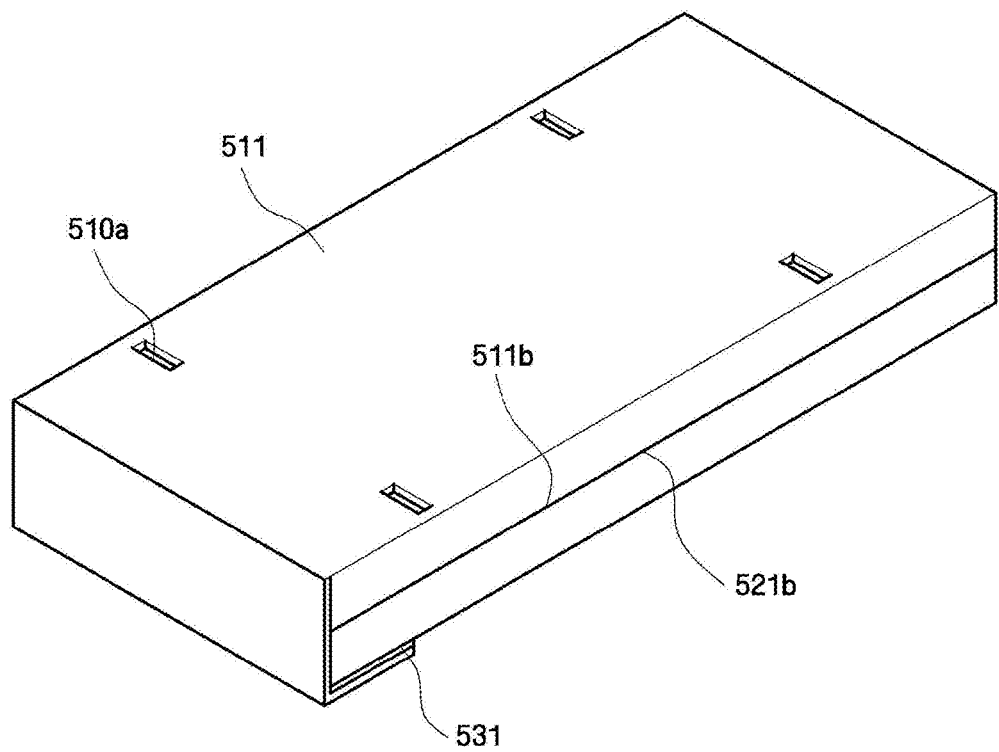

Referring to FIG. 6D, an end of the upper packing sheet 511 is bent, and the edge of the short side 511c of the upper packing sheet 511, on which the adhesive layer 531 is disposed, is adhered to the lower surface of the lower packing sheet 521, to essentially close the open end of the packing sheet 501 and dispose the whole of the optical sheets 140, the reflective sheet 150, and the light source covers 300 within the packing sheet 501.

As in the second exemplary embodiment, panel guides 400 are fixed to the panel guide-fixing protrusions 220, respectively, and a liquid crystal panel 113 is placed on the panel guides 400. Finally, an upper housing 160 is coupled to the packing sheet 501.

Figure 7:
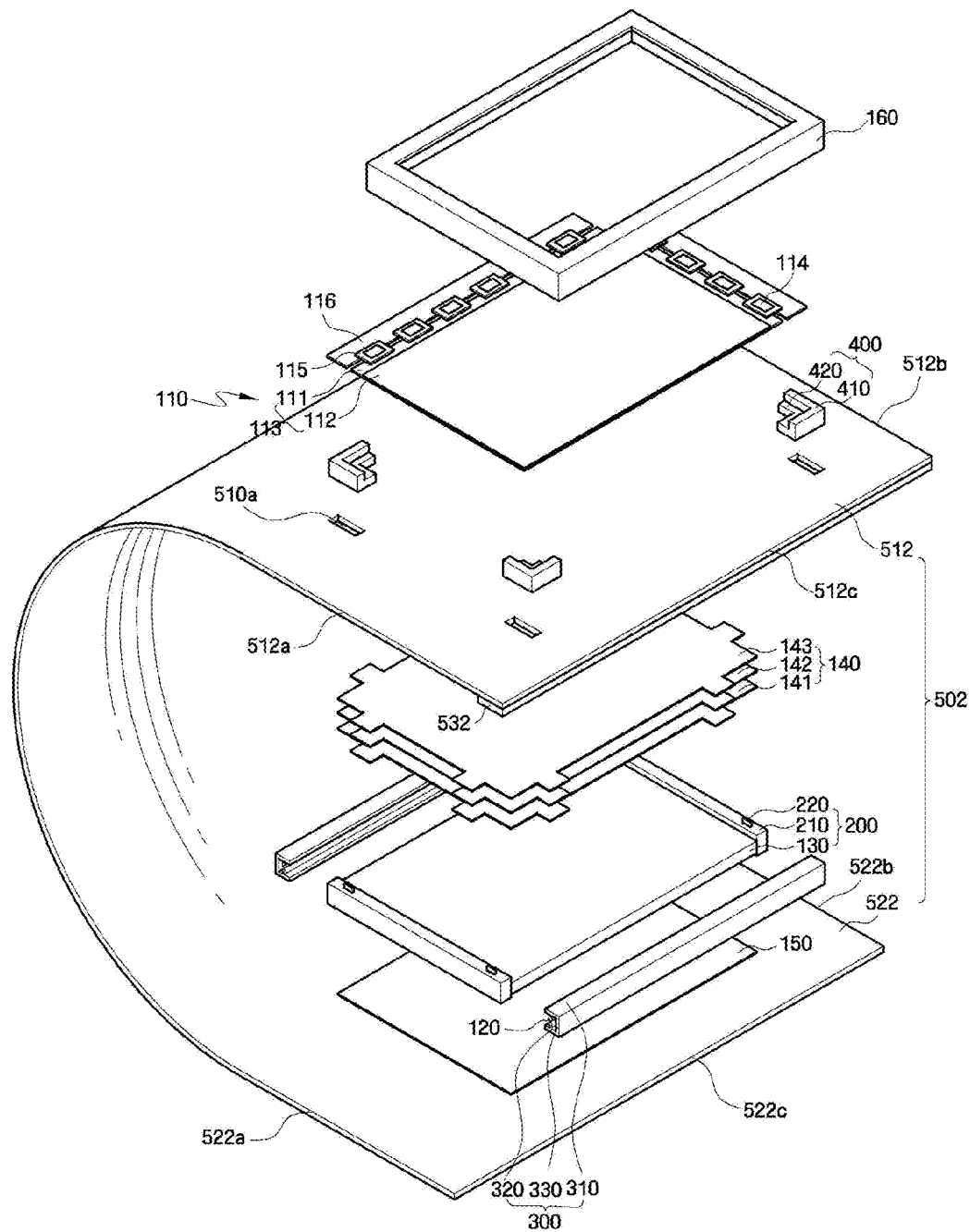
FIG. 7 is an exploded perspective view of an LCD according to a fifth exemplary embodiment of the present invention.

Hereinafter, an LCD according to a fifth exemplary embodiment of the present invention will be described in detail. FIG. 7 is an exploded perspective view of the LCD according to the fifth exemplary embodiment of the present invention.

Referring to FIG. 7, the LCD according to the illustrated embodiment is identical to the LCD according to the third exemplary embodiment in that an upper and lower packing sheets 512 and 522 are disposed continuously with each other to form a packing sheet 502. In the illustrated embodiment, however, the lower packing sheet 522 longitudinally extends in a short-side direction of the upper packing sheet 512, which is a longitudinal direction of the LCD.

Short sides 512a and 512b of the upper packing sheet 512 may be thermally pressed against short sides 522a and 522b of the lower packing sheet 522 which correspond to the short sides 512a and 512b of the upper packing sheet 512, respectively. An adhesive layer 532 is disposed on an edge of a long side 512c of the upper packing sheet 512. The adhesive layer 532 is adhered to a lower surface of the lower packing sheet 521 at an overlapping portion of the lower packing sheet 521 adjacent to the long side 522c.

Figure 8A:
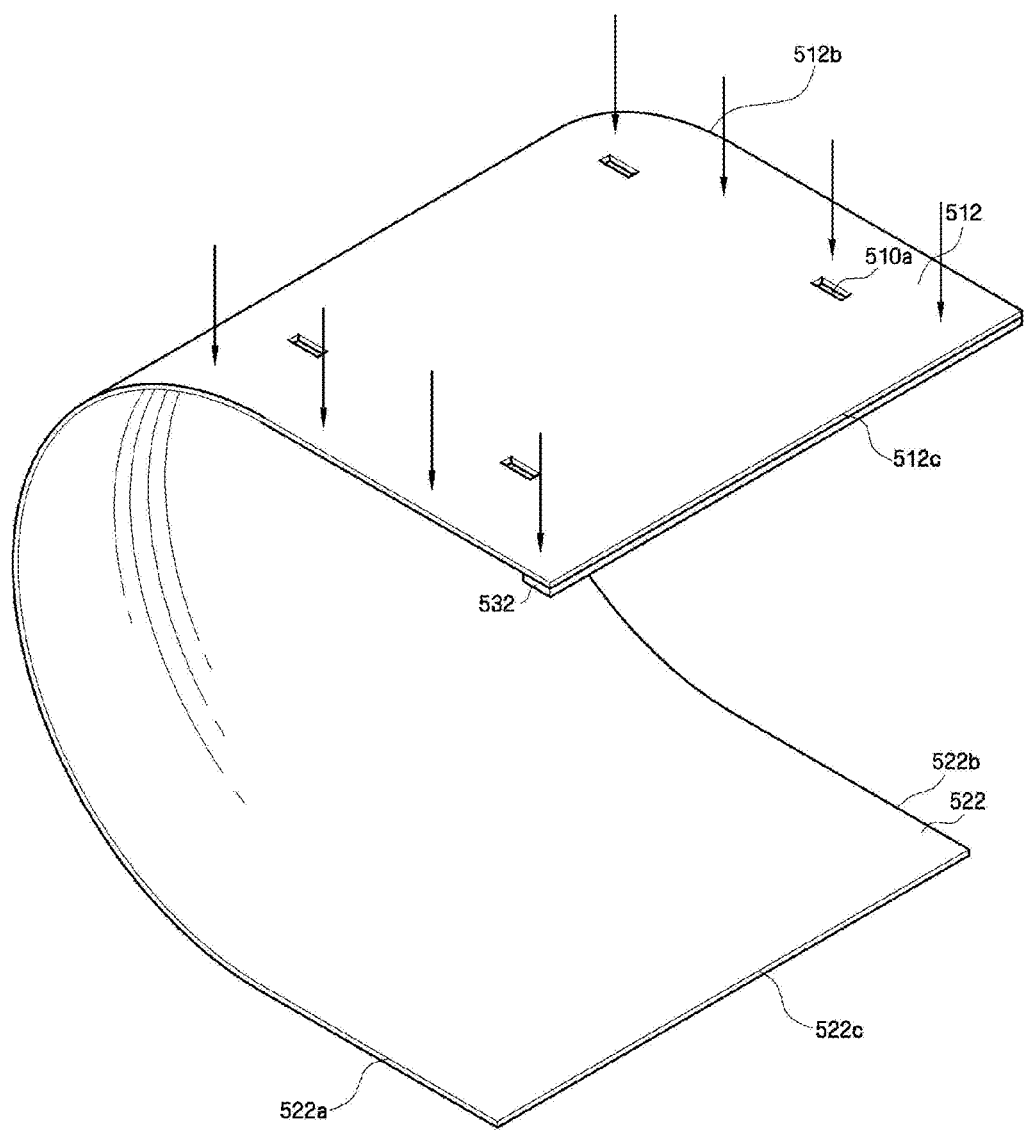
FIGS. 8A through 8C are views sequentially illustrating processes included in a method of assembling an LCD according to a sixth exemplary embodiment of the present invention.
Figure 8B:
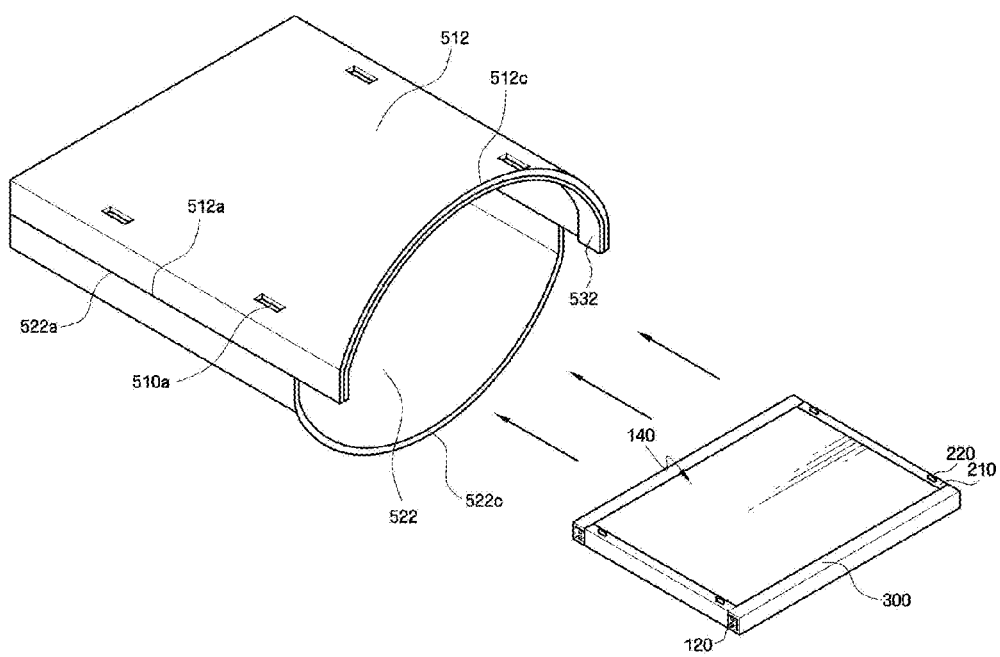
Figure 8C:
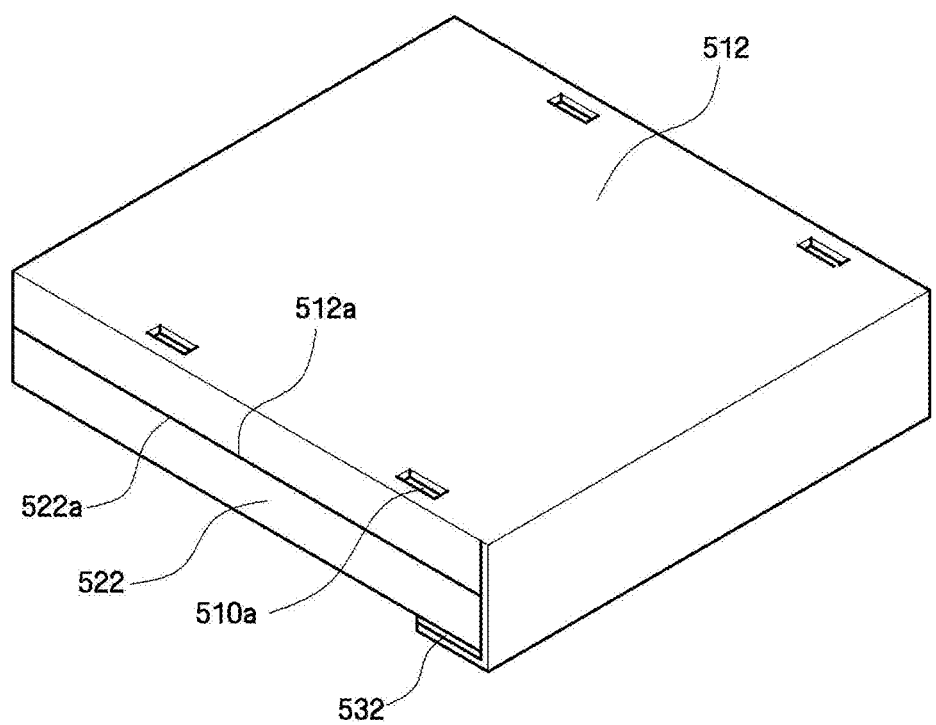

Hereinafter, a method of assembling an LCD according to a sixth exemplary embodiment of the present invention will be described in detail with reference to FIGS. 7 and 8A through 8C. FIGS. 8A through 8C are views sequentially illustrating processes included in the method of assembling an LCD according to the sixth exemplary embodiment of the present invention.

Referring to FIG. 8A, the packing sheet 502 including air holes 510a is provided. As in the fifth exemplary embodiment, the packing sheet 502 includes the upper packing sheet 512 and the lower packing sheet 522 which extends in the short-side direction of the upper packing sheet 512. The packing sheet 502 is provided as a single and continuous member defined by the upper and lower packing sheets 512 and 522. The short sides 512a and 522a, and the short sides 512b and 522b, collectively define single and continuous longitudinal edges of the packing sheet 502, respectively. The packing sheet 502 longitudinally extends in a transverse direction of the LCD.

The short sides 512a and 512b of the upper packing sheet 512 are thermally pressed against the short sides 522a and 522b of the lower packing sheet 522 which correspond to the short sides 512a and 512b of the upper packing sheet 512, respectively. In the case, thermal pressure may be applied onto the upper and lower packing sheets 512 and 522 in a direction indicated by arrows.

Referring to FIG. 8B, the optical sheets 140, the LGP 130, the light source covers 300, and the reflective sheet 150 are inserted into the envelope-shaped packing sheet 502, in an insertion direction substantially parallel with the transverse direction of the LCD. At the open side of the bonded packing sheet 502, the long side 512c of the upper packing sheet 512 extends further in the longitudinal direction of the packing sheet 502, than the long side 522c of the lower packing sheet 522. A distance of extension of the long side 512c of the upper packing sheet 512 may be substantially the same or greater than a width of the adhesive layer 532 taken in the longitudinal direction of the packing sheet 502.

Referring to FIG. 8C, the upper packing sheet 512 is bent, and the edge of the long side 512c of the upper packing sheet 511, on which the adhesive layer 532 is disposed, is adhered to the lower surface of the lower packing sheet 522.

Figure 9:
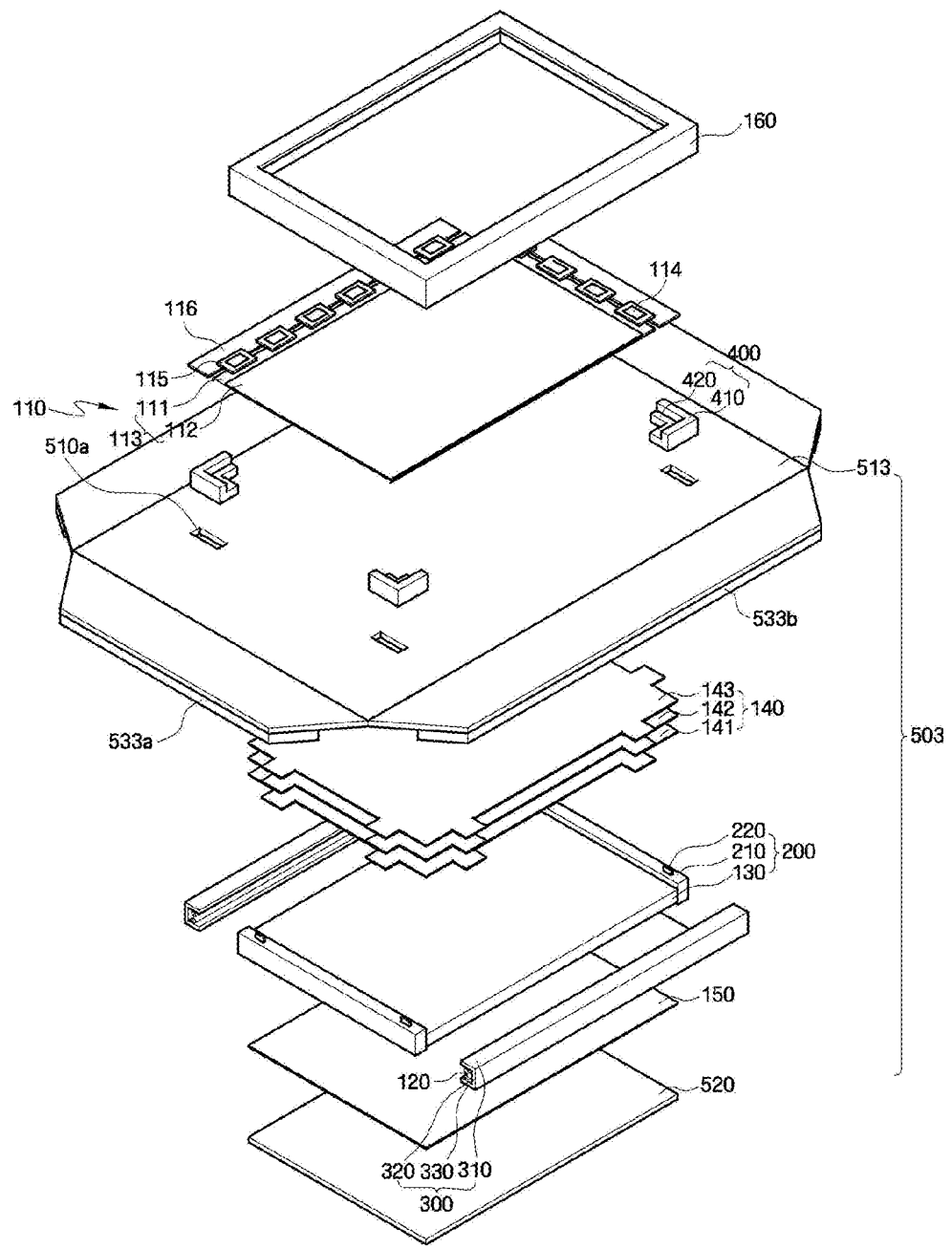
FIG. 9 is an exploded perspective view of an LCD according to a seventh exemplary embodiment of the present invention.

Hereinafter, an LCD according to a seventh exemplary embodiment of the present invention will be described in detail with reference to FIG. 9. FIG. 9 is an exploded perspective view of the LCD according to the seventh exemplary embodiment of the present invention.

Referring to FIG. 9, an adhesive layer 533a or 533b is disposed on an edge of a lower surface at each side of an upper packing sheet 513. In the illustrated embodiment, the adhesive layer 533a and 533b longitudinally extends substantially a whole length of the sides of the upper packing sheet 513, and are disposed on each of four sides of the upper packing sheet 513. In the illustrated embodiment, the upper packing sheet 513 and a lower packing sheet 520 are individually formed separately, and the adhesive layers 533a and 533b are adhered to a lower surface of the lower packing sheet 520.

The upper packing sheet 513 includes a main portion which is substantially rectilinear, and side portions extending from edges of the main portion. Each of the side portions includes a first edge substantially the same as a respective edge of the main portion, and a second edge at a distal end of the side portions. A longitudinally length of each second edge of a side portion, is smaller than a longitudinal length of each first edge of the side portion, such that end edges of the side portion are inclined.

The lower packing sheet 520 according to the illustrated embodiment is shorter in a longitudinal direction than those according to previously illustrated embodiments. Thus, the lower packing sheet 520 according to the illustrated embodiment does not cover side surfaces of an LGP 130 and is disposed only under a reflective sheet 150.

The adhesive layers 533a and 533b, which are disposed on the edges of the four sides of the upper packing sheet 513, respectively, are adhered to a rear surface of the lower packing sheet 520 disposed under the reflective sheet 150. The bonding area of the packing sheet 503 is completely disposed at a rear of the reflective sheet 150, and not at sides of the LGP 130 as in previously illustrated embodiments. Advantageously, since the upper packing sheet 513 and the lower packing sheet 520 are not bonded to each other on the side surfaces of the LGP 130, the risk that bonding portions of the upper packing sheet 513 and the lower packing sheet 520 will move or crease can be reduced. Furthermore, since the bonding portions are not located on or overlapping a liquid crystal panel 113, a reduction in the luminance of the LCD can be reduced or effectively prevented.

Figure 10:
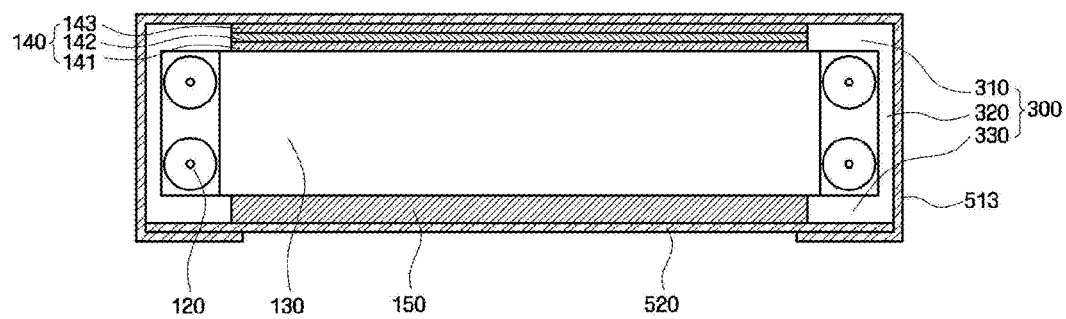
FIG. 10 is a view for explaining a method of assembling an LCD according to an eighth exemplary embodiment of the present invention.

Hereinafter, a method of assembling an LCD according to an eighth exemplary embodiment of the present invention will be described in detail with reference to FIGS. 9 and 10. FIG. 10 is a cross-sectional view for explaining the method of assembling an LCD according to the eighth exemplary embodiment of the present invention.

Referring to FIG. 10, the packing sheet 503 including air holes 510a is provided.

The lower and upper packing sheets 520 and 513 are disposed under and on the optical sheets 140, the LGP 130, the light source covers 300, and the reflective sheet 150, respectively.

The adhesive layers 533a and 533b, which are disposed on the edges of the four sides of the upper packing sheet 513, are adhered to the lower surface of the lower packing sheet 520. Thereafter, panel guides 400 and the liquid crystal panel 113 are placed on the packing sheet 503. As a result, the LCD of FIG. 9 is completely assembled.

Figure 11:
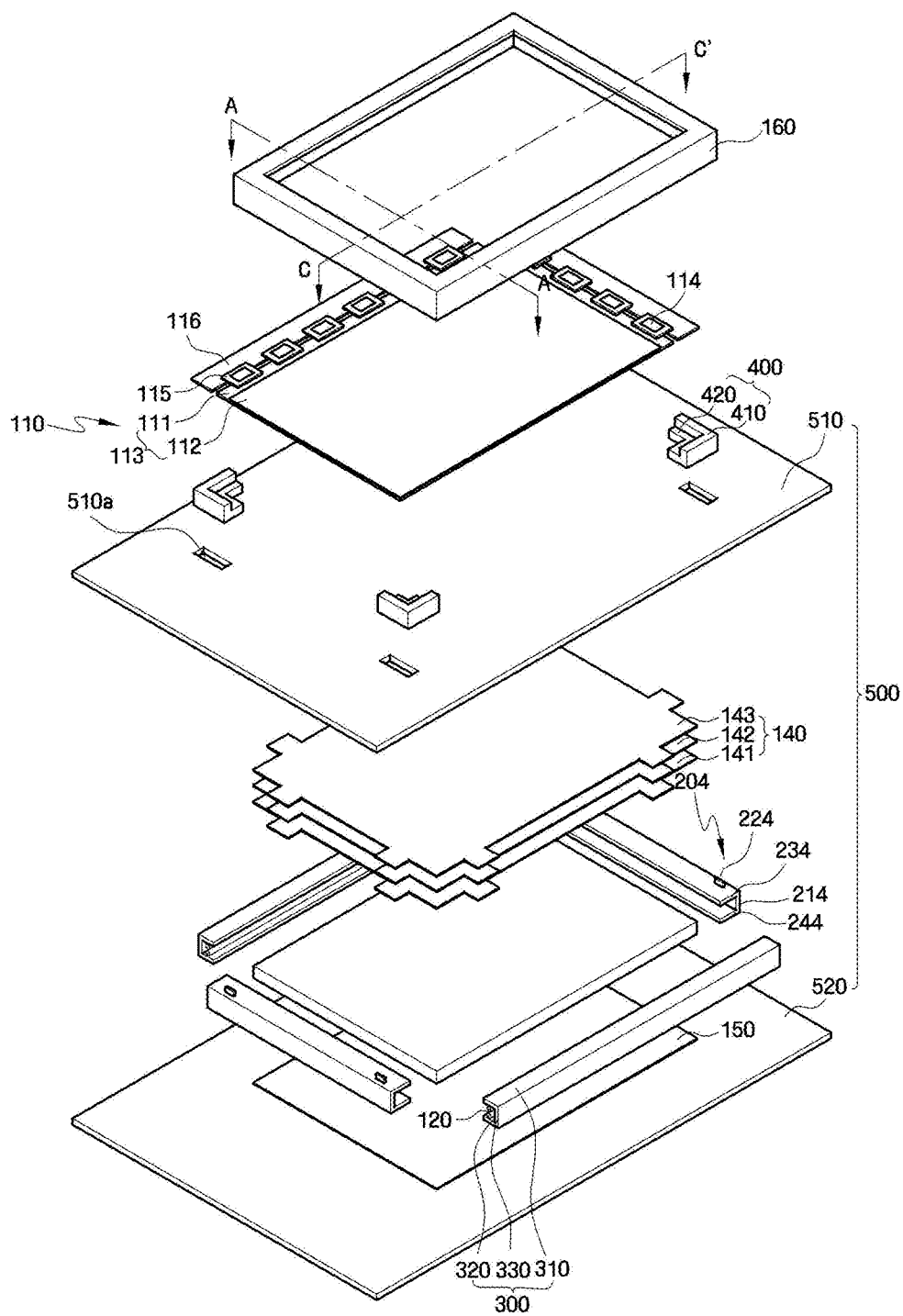
FIG. 11 is an exploded perspective view of an LCD according to a ninth exemplary embodiment of the present invention.
Figure 12:
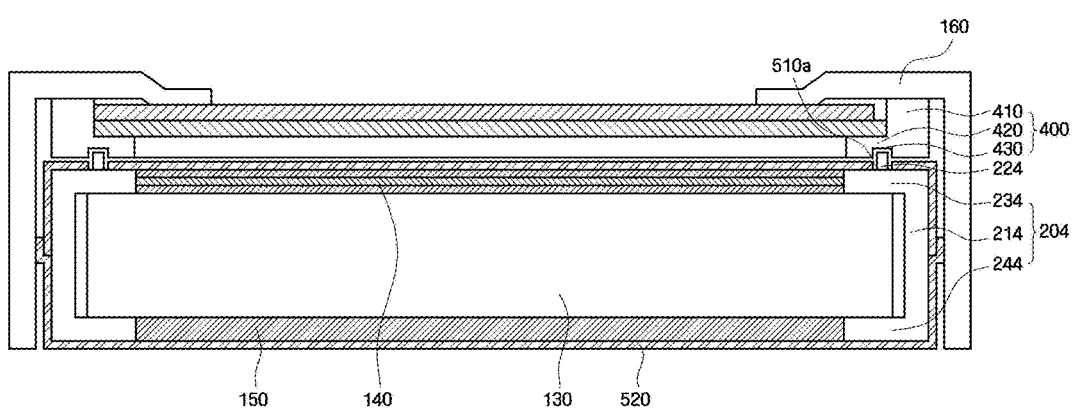
FIG. 12 is a cross-sectional view of the, taken along line C-C' of FIG. 11.

Hereinafter, an LCD according to a ninth exemplary embodiment of the present invention will be described in detail with reference to FIGS. 11 and 12. FIG. 11 is an exploded perspective view of the LCD according to the ninth exemplary embodiment of the present invention. FIG. 12 is a cross-sectional view of the LCD according to the ninth exemplary embodiment of the present invention, taken along line C-C' of FIG. 11.

While the LCD according to the first exemplary embodiment includes the LGP assembly 200 (see FIG. 1), the LCD according to the illustrated embodiment includes a plurality of a guide member 204, each fixing an end of optical sheets 140 to an end of an LGP 130.

The guide members 204 may be disposed longitudinally extended substantially perpendicular to a longitudinal extension direction of the light source covers 300. The guide members 204 may be disposed facing each other and may be disposed substantially parallel to short (e.g., transverse) sides of the LGP 130, respectively. In a cross-sectional view, the guide members 204 may be shaped like English character "U" and extend in a short-side direction of the LGP 130. Each of the guide members 204 may include a sheet holder sidewall 214, a guide member upper surface 234, and a guide member lower surface 244. A plurality of a panel guide-fixing protrusions 224 may be disposed on each of the guide member upper surfaces 234. The panel guide-fixing protrusions 224 may be disposed on the guide members 204 as illustrated in FIG. 11, or may be disposed on an upper surface of the light source covers 300.

Referring to FIG. 12, the guide member upper surface 234 may press the optical sheets 140 against the LGP 130 and thus fix the optical sheets 140 to the LGP 130. Outer edge surfaces of the optical sheets 140 are disposed contacting an inner edge surface of the guide member upper surface 234, and an uppermost surface of the optical sheets 140 may be substantially coplanar with an uppermost surface of the guide member upper surface 234. The guide member lower surface 244 may fix a reflective sheet 150 to a lower surface of the LGP 130. Outer edge surfaces of the reflective sheet 150 are disposed contacting an inner edge surface of the guide member lower surface 244, and a lowermost surface of the reflective sheet 150 may be substantially coplanar with a lowermost surface of the guide member lower surface 244.

In the illustrated embodiment, outer edges of the LGP 130 may be disposed separated from inner surfaces of the sheet holder sidewall 214. A portion of the LGP 130 is disposed between the guide member upper surface 234 and the guide member lower surface 244, unlike the first exemplary embodiment in FIGS. 1 and 3, where outer edges of the LGP 130 are disposed coplanar with the inner surface of the sheet support 210.

The guide member upper surface 234 may be at the same height as an upper surface 310 of each of the light source covers 300, such that upper surfaces of both the guide member upper surface 234 and the light source covers 300 are coplanar. Accordingly, an upper packing sheet 510 and lower packing sheet 520 of a packing sheet 500 can remain flat (e.g., parallel with the reflective sheet 150 and the optical sheets 140) on the guide member upper surface 234 and the upper surface 310, and under the reflective sheet 150, respectively. Advantageously, packing uniformity can be enhanced.

Figure 13A:
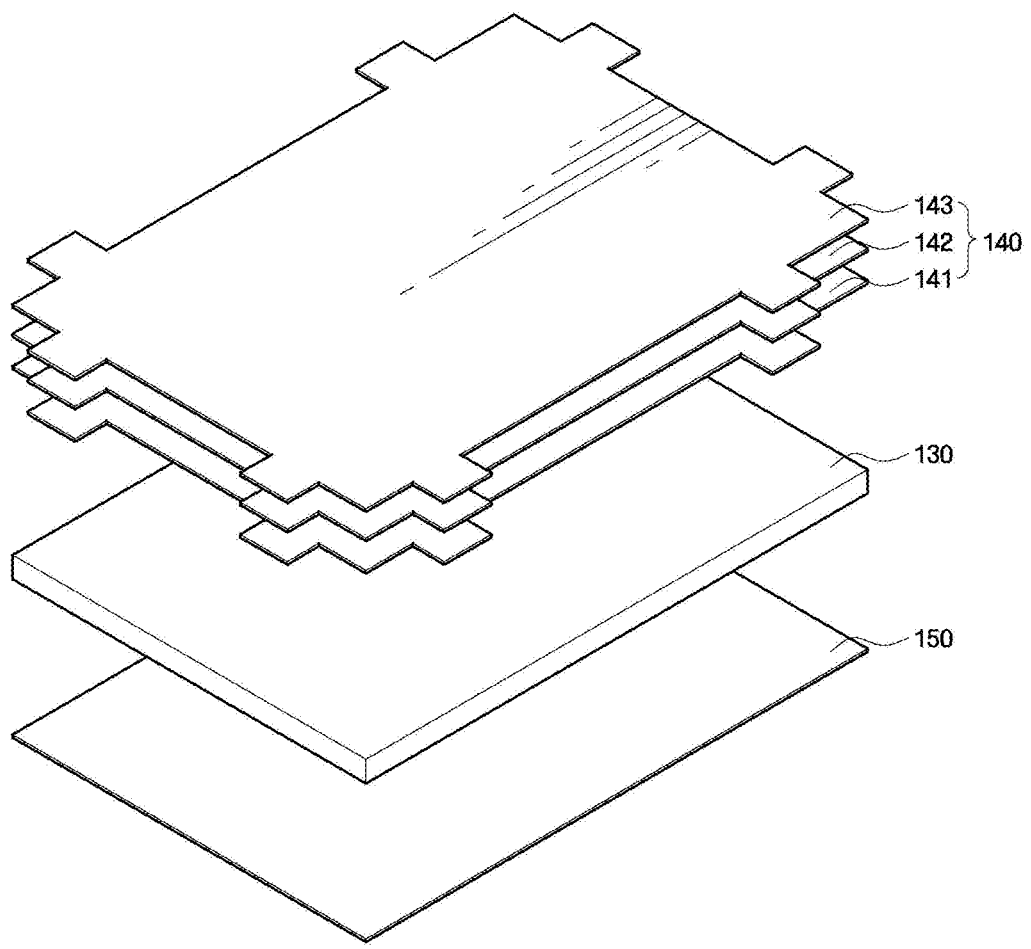
FIG. 13A through 13C are views sequentially illustrating processes included in a method of assembling an LCD according to a tenth exemplary embodiment of the present invention.
Figure 13B:
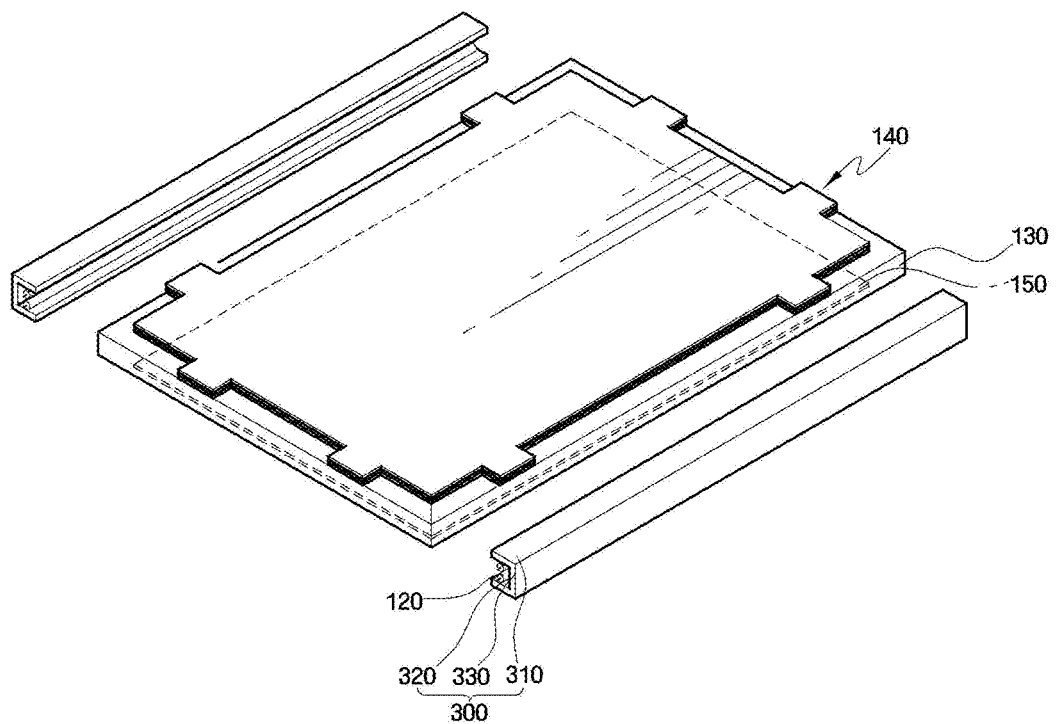
Figure 13C:
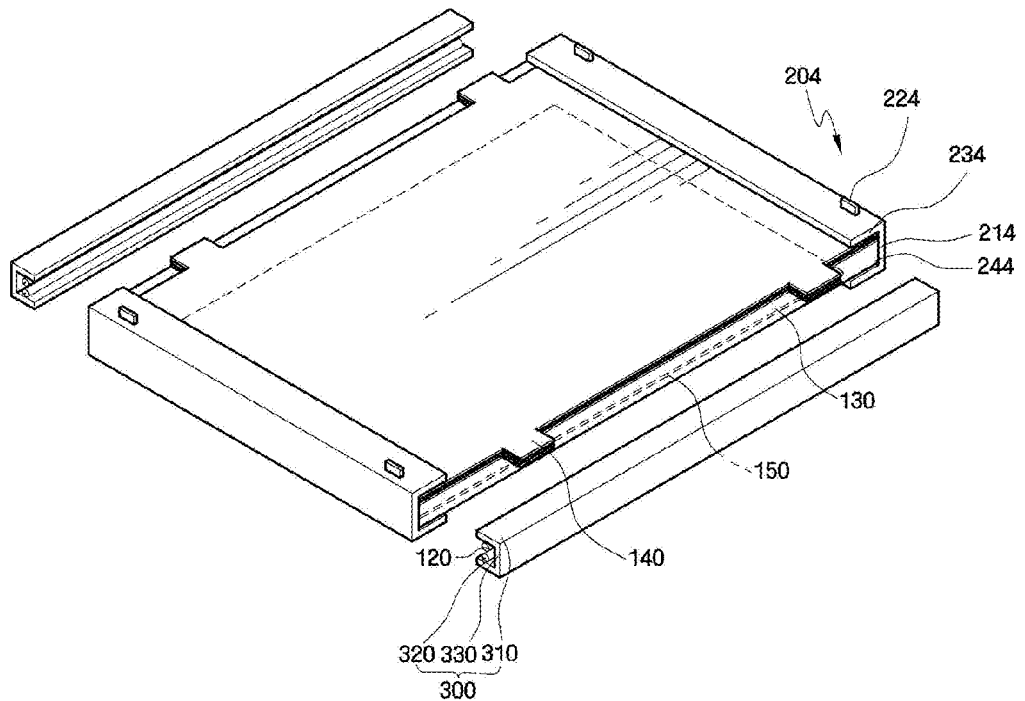

Hereinafter, a method of assembling an LCD according to a tenth exemplary embodiment of the present invention will be described in detail with reference to FIGS. 11, 12 and 13A through 13C. FIG. 13A through 13C are views sequentially illustrating processes included in the method of assembling an LCD according to the tenth exemplary embodiment of the present invention.

Referring to FIGS. 11 and 13A, the LGP 130 is provided, and the optical sheets 140 and the reflective sheet 150 are disposed on and under the LGP 130, respectively.

Referring to FIG. 13B, light sources 120 and the light source covers 300 are disposed one or more sides of the LGP 130. In the illustrated embodiment, a case where the light source covers 300 are disposed longitudinally extending to long sides of the LGP 130, respectively, will be described. The upper surface 310 of each of the light source covers 300 may fix the optical sheets 140 to the LGP 130, and the lower surface 330 of each of the light source covers 300 may fix the reflective sheet 150 to the lower surface of the LGP 130.

Referring to FIG. 13C, the guide members 204 are disposed longitudinally extending parallel to the short sides of the LGP 130. The guide member upper surface 234 of each of the guide members 204 may press the optical sheets 140 against the LGP 130 and thus fix the optical sheets 140 to the LGP 130. In addition, the guide member lower surface 244 of each of the guide members 204 may press the reflective sheet 150 against the lower surface of the LGP 130 and thus fix the reflective sheet 150 to the lower surface of the LGP 130.

Finally, the panel guides 400 and the liquid crystal panel 113 are disposed as shown in FIG. 11. As a result, the LCD is completely assembled.

Figure 14:
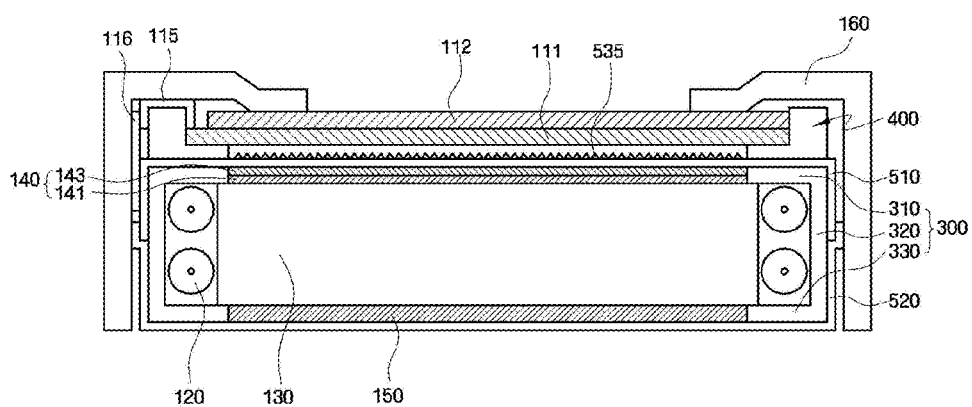
FIG. 14 is a cross-sectional view of an LCD according to an eleventh exemplary embodiment of the present invention.

Hereinafter, an LCD according to an eleventh exemplary embodiment of the present invention will be described in detail. FIG. 14 is a cross-sectional view of the LCD according to the eleventh exemplary embodiment of the present invention.

Referring to FIG. 14, unlike the first exemplary embodiment in FIG. 2, the LCD according to the illustrated embodiment includes a prism pattern 535 disposed on an upper surface of an upper packing sheet 510. Since the prism pattern 535 is disposed on an upper surface of the upper packing sheet 510, optical sheets 140 may not include a prism sheet 142. Advantageously, elements of the LCD disposed between the upper packing sheet 510 and a lower packing sheet 520 can be more easily integrated with each other since one less member (e.g., the prism sheet 142) is required, further reducing time and costs of manufacturing the LCD.

The prism pattern 535 disposed on the upper packing sheet 510 may include an array of triangular prisms, lenses, and/or lenticular lenses.

Figure 15:
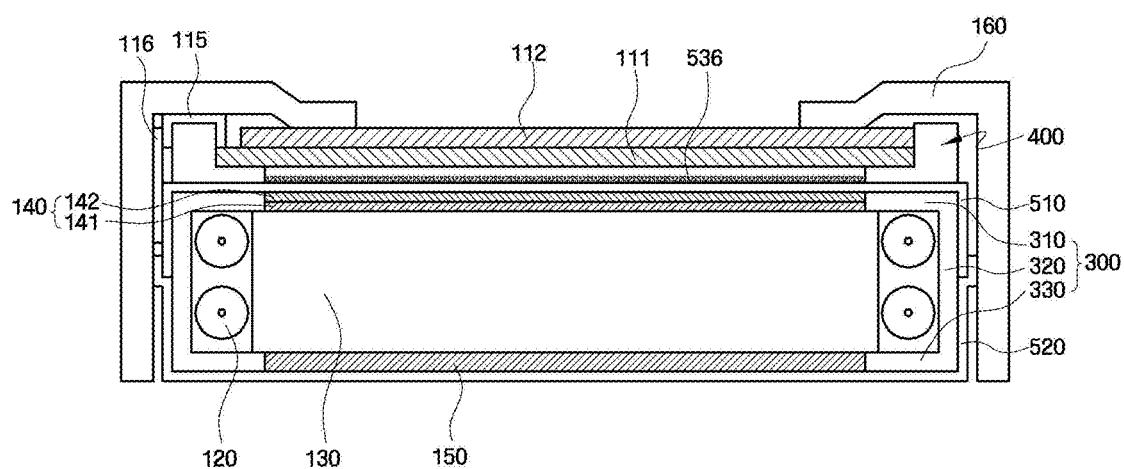
FIG. 15 is a cross-sectional view of an LCD according to a twelfth exemplary embodiment of the present invention.

Hereinafter, an LCD according to a twelfth exemplary embodiment of the present invention will be described in detail with reference to FIG. 15. FIG. 15 is a cross-sectional view of the LCD according to the twelfth exemplary embodiment of the present invention.

Referring to FIG. 15, optical sheets 140 according to the illustrated embodiment do not include a protective sheet (see the protective sheet 143 in FIG. 1). Instead, a protective particle layer 536 is disposed on an upper surface of an upper packing sheet 510.

In an exemplary embodiment, the protective particle layer 536 may include organic particles, such as acrylic, silica, or urethane particles. In addition, particles of the protective particle layer 536 may be shaped like spheres, pellets, or oval spheres. The protective particle layer 536 improves the scratch-proofness of the upper packing sheet 510 and a lower packing sheet 520. Since the protective particle layer 536 is disposed between the a liquid crystal panel 113 and the upper packing sheet 510, rubbing and grinding of the liquid crystal panel 113 against the upper packing sheet 510 can be reduced or effectively prevented. Since the protective particle layer 536 is disposed on an upper surface of the upper packing sheet 510, the protective sheet may be omitted and thus may not be wrapped in the upper and lower packing sheets 510 and 520. Advantageously, elements of the LCD disposed between the upper packing sheet 510 and a lower packing sheet 520 can be more easily integrated with each other since one less member (e.g., the protective sheet) is required, further reducing time and costs of manufacturing the LCD.

In an exemplary embodiment, the protective particle layer 536 may be formed such that the upper and lower packing sheets 510 and 520 have a haze value of about 3% to about 70%. When the upper and lower packing sheets 510 and 520 have a haze value of less than about 3%, the density of organic particles of the protective particle layer 536 is relatively low. Thus, the liquid crystal panel 113 and the upper packing sheet 510 may grind each other. When the upper and lower packing sheets 510 and 520 have a haze of about 70% or more, they may become hazy, thereby undesirably reducing the luminance of the LCD.

The protective particle layer 536 according to the illustrated embodiment is not limited to the above configuration. Alternatively, the protective particle layer 536 may be integrated with the prism pattern 535 as described with respect to the eleventh exemplary embodiment, and then both disposed on the upper packing sheet 510.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display comprising:
a backlight assembly comprising:
  a light guide plate including a light emitting surface facing a display panel, a lower surface opposing the light emitting surface, a light incident surface connecting the light emitting and lower surfaces to each other, and a plurality of side surfaces not parallel to the light incident surface, and connecting the light emitting and lower surfaces to each other,
  optical sheets which are disposed on the light guide plate,
  a reflective sheet which is disposed under the light guide plate opposing the optical sheets,
  light sources facing and adjacent to the light incident surface,
  light source covers which cover the light sources, respectively,
  guide members lengthwise respectively substantially parallel and adjacent to the plurality of side surfaces, and
  a packing sheet within which the light guide plate, the optical sheets, the reflective sheet, the light source covers, and the guide members are disposed;
panel guides which are disposed on an upper surface of the packing sheet and coupled to the guide members, respectively; and
a liquid crystal panel which is disposed on the panel guides.

2. The liquid crystal display of claim 1,
wherein the packing sheet comprises through-holes at locations corresponding to locations of the panel guides, respectively, and
wherein each of the guide members comprises a plurality of a panel guide-fixing protrusions disposed on an upper surface of the guide members, the panel guide-fixing protrusions of the guide member are disposed extending completely through the through-holes of the packing sheet, and are coupled to the panel guides, respectively.

3. The liquid crystal display of claim 1, wherein the upper surface of each of the guide members, which excludes the panel guide-fixing protrusions, is on a same plane as an upper surface of each of the light source covers.

4. The liquid crystal display of claim 3, wherein the packing sheet comprises:
an upper packing sheet which directly contacts the upper surface of each of the guide members and the upper surface of each of the light source covers; and
a lower packing sheet which directly contacts a lower surface of each of the guide members and a lower surface of each of the light source covers.

5. The liquid crystal display of claim 4, further comprising an adhesive layer which is formed on an edge of each side of the upper packing sheet, wherein the upper packing sheet and the lower packing sheet are formed separately, and the adhesive layer is adhered to a lower surface of the lower packing sheet.

6. The liquid crystal display of claim 4, wherein the lower packing sheet lengthwise extends in a transverse direction or a longitudinal direction of the upper packing sheet, and is disposed continuously with the upper packing sheet such that the packing sheet is a single and continuous member.

7. The liquid crystal display of claim 6, further comprising an adhesive layer which is disposed on an edge of a distal end of the upper packing sheet opposing the lower packing sheet, wherein the adhesive layer is adhered to a lower surface of a distal end of the lower packing sheet when the upper packing sheet and the lower packing sheet are combined.

8. The liquid crystal display of claim 1, further comprising a protective particle layer which is disposed on the upper surface of the packing sheet.

9. The liquid crystal display of claim 8, wherein the protective particle layer is configured such that the packing sheet has a haze value of about 3% to about 70%.

10. The liquid crystal display of claim 1, further comprising a prism pattern which is disposed on the upper surface of the packing sheet.

11. The liquid crystal display of claim 1, wherein the packing sheet has a thickness taken in a direction orthogonal to the first and second directions of about 10 micrometers (μm) to about 150 micrometers (μm).

12. The liquid crystal display of claim 1, wherein the packing sheet has a surface resistance of about $10^8$ Ohms ($\Omega$) to about $10^{15}$ Ohms ($\Omega$).

13. A method of assembling a liquid crystal display, the method comprising:
disposing one or more optical sheets on a light guide plate, and disposing a reflective sheet under the light guide plate opposing the optical sheets,
the light guide plate including a light emitting surface facing a display panel, a lower surface opposing the light emitting surface, a light incident surface connecting the light emitting and lower surfaces to each other, and a plurality of side surfaces not parallel to the light incident surface, and connecting the light emitting and lower surfaces to each other;
disposing light sources facing and adjacent to the light incident surface, and disposing light source covers which cover the light sources, respectively, an upper surface of the light source covers being coplanar with an uppermost surface of the optical sheets;
providing guide members each of which lengthwise extends substantially parallel and adjacent to the plurality of side surfaces;
wrapping the light guide plate, the optical sheets, the reflective sheet, the light source covers, and the guide members in a packing sheet;
coupling panel guides to the guide members, respectively, and disposing a portion of the packing sheet between the panel guides and the guide members; and
disposing a liquid crystal panel on the panel guides.

14. The method of claim 13, wherein the packing sheet comprises:
an upper packing sheet which directly contacts the upper surface of each of the light source covers, the upper packing sheet including a plurality of edges; and
a lower packing sheet which directly contacts a lower surface of each of the light source covers.

15. The method of claim 14, wherein
the packing sheet further comprises an adhesive layer which is disposed on a lower surface and adjacent to each of the edges of the upper packing sheet,
the upper packing sheet and the lower packing sheet are formed separately, and
the wrapping of the light guide plate, the optical sheets, the reflective sheet, the light source covers, and the guide members in a packing sheet comprises adhering the adhesive layer disposed adjacent to each of the edges of the upper packing sheet, to a lower surface of the lower packing sheet.

16. The method of claim 14, wherein the packing sheet further comprises an adhesive layer which is formed on a lower surface and adjacent to a first edge of the upper packing sheet lengthwise extending in a third direction, the lower packing sheet lengthwise extends in a transverse direction or a longitudinal direction of the upper packing sheet, and is disposed continuously with the upper packing sheet, such that the packing sheet comprises a single and continuous second edge, and a single and continuous third edge, each lengthwise extended in a fourth direction crossing the third direction, and the wrapping of the light guide plate, the optical sheets, the reflective sheet, the light source covers, and the guide members in the packing sheet comprises:

thermally pressing portions of the second edge of packing sheet together and portions of the third edge of the packing sheet together, thereby leaving a side of the packing sheet open;

inserting the optical sheets, the light guide plate, the light source covers, the reflective sheet, and the guide members into the packing sheet through the open side; and adhering the adhesive layer at the first edge of the upper packing sheet to the lower surface of the lower packing sheet.

17. The method of claim 16, wherein the adhering the adhesive layer at the first edge of the upper packing sheet to the lower surface of the lower packing sheet, disposes an entire of the light guide plate, the optical sheets, the reflective sheet and the light source covers within the packing sheet, and disposes a portion of the guide members in the packing sheet.

18. The method of claim 13, wherein, the providing guide members includes disposing an upper surface of each of the guide members on a same plane as the upper surface of each of the light source covers.

19. The method of claim 18, wherein the liquid crystal display further comprises through-holes extended completely through the packing sheet, and each of the guide members comprises a plurality of a panel guide-fixing protrusion which are disposed on the upper surface of each of the guide members, each of the panel guide-fixing protrusion passing through the through-holes, respectively, and the coupling panel guides to the guide members comprises fixing the panel guides to the panel guide-fixing protrusions of the guide members, respectively, after the wrapping of the light guide plate, the optical sheets, the reflective sheet, the light source covers, and the guide members in the packing sheet.

* * * * *